US012728536B2

(12) United States Patent
Watabe et al.

(10) Patent No.: US 12,728,536 B2
(45) Date of Patent: Sep. 8, 2026

(54) ROBOT REMOTE OPERATION CONTROL DEVICE, ROBOT REMOTE OPERATION CONTROL SYSTEM, ROBOT REMOTE OPERATION CONTROL METHOD, AND PROGRAM

(71) Applicant: HONDA MOTOR CO., LTD., Tokyo (JP)

(72) Inventors: Tomoki Watabe, Wako (JP); Akira Mizutani, Wako (JP); Takeshi Chiku, Wako (JP); Yili Dong, Wako (JP); Tomohiro Chaki, Wako (JP); Nanami Tsukamoto, Wako (JP); Naoki Hosomi, Wako (JP); Anirudh reddy Kondapally, Wako (JP); Takahide Yoshiike, Wako (JP); Christian Goerick, Offenbach/Am Maiin (DE); Dirk Ruiken, Offenbach/Am Main (DE); Bram Bolder, Offenbach/Am Main (DE); Mathias Franzius, Offenbach/Am Main (DE); Simon Manschitz, Offenbach/Am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 18/280,959

(22) PCT Filed: Mar. 16, 2022

(86) PCT No.: PCT/JP2022/012089

§ 371 (c)(1),
(2) Date: Sep. 8, 2023

(87) PCT Pub. No.: WO2022/209924

PCT Pub. Date: Oct. 6, 2022

(65) Prior Publication Data

US 2024/0149458 A1 May 9, 2024

(30) Foreign Application Priority Data

Mar. 31, 2021 (JP) ................................ 2021-058952
Mar. 31, 2021 (JP) ................................ 2021-060904
(Continued)

(51) Int. Cl.
*B25J 13/00* (2006.01)
*B25J 9/16* (2006.01)
(Continued)

(52) U.S. Cl.
CPC ............ *B25J 9/1689* (2013.01); *B25J 13/08* (2013.01)

(58) Field of Classification Search
CPC . B25J 9/1689; B25J 13/08; B25J 13/02; B25J 13/00; G05B 2219/35482; G05B 2219/40264; G05B 2219/40391
See application file for complete search history.

(56) References Cited

U.S. PATENT DOCUMENTS 4,837,734 A 6/1989 Ichikawa et al.
10,166,676 B1 * 1/2019 Hudson ................. B25J 9/1612
(Continued)

FOREIGN PATENT DOCUMENTS

CN 107972028 5/2018
CN 111482965 8/2020
(Continued)

OTHER PUBLICATIONS

Jain, Siddarth and Argall, Brenna, Recursive Bayesian Human Intent Recognition in Shared-Control Robotics, Oct. 1-5, 2018, 2018 IEEE/RSJ International Conference on Intelligent Robots and Systems (IROS) (Year: 2018).*
(Continued)

*Primary Examiner* — Adam R Mott
*Assistant Examiner* — Heather J Keniry

(74) *Attorney, Agent, or Firm* — Amin, Turocy & Watson, LLP

(57) ABSTRACT

A robot remote operation control device includes, in robot remote operation control for an operator to remotely operate a robot capable of gripping an object, an information acquisition unit that acquires operator state information on a state of the operator who operates the robot, an intention estimation unit that estimates a motion intention of the operator who causes the robot to perform a motion, on the basis of the operator state information, and a gripping method determination unit that determines a gripping method for the object on the basis of the estimated motion intention of the operator.

12 Claims, 18 Drawing Sheets

(30) Foreign Application Priority Data

Mar. 31, 2021 (JP) ................................ 2021-060914
Mar. 31, 2021 (JP) ................................ 2021-061137

(51) Int. Cl.
*B25J 13/02* (2006.01)
*B25J 13/08* (2006.01)

(56) References Cited

U.S. PATENT DOCUMENTS

| | | | |
|---|---|---|---|
| 2013/0173055 A1 | 7/2013 | Kim et al. | |
| 2020/0130190 A1 | 4/2020 | Thackston et al. | |
| 2020/0215691 A1* | 7/2020 | Saruta | B25J 9/1697 |
| 2021/0069894 A1 | 3/2021 | Rod et al. | |

FOREIGN PATENT DOCUMENTS

| | | |
|---|---|---|
| CN | 112154047 | 12/2020 |
| EP | 3626401 A1 | 3/2020 |
| JP | 62-199376 | 9/1987 |
| JP | 64-034687 | 2/1989 |
| JP | 08-281573 | 10/1996 |
| JP | 2005-161498 | 6/2005 |
| JP | 2006-212741 | 8/2006 |
| JP | 2016-144852 | 8/2016 |
| JP | 2017-196678 | 11/2017 |
| JP | 2018-153874 | 10/2018 |
| JP | 6476358 | 2/2019 |
| JP | 2019-215769 | 12/2019 |
| JP | 2019-217557 | 12/2019 |
| JP | 2020-156800 | 10/2020 |
| WO | 2019/059364 | 3/2019 |
| WO | 2020/196338 | 10/2020 |

OTHER PUBLICATIONS

European Search Report for European Patent Application No. 22780144.6 dated Nov. 25, 2024.

Negishi Kenta et al: "Operation assistance using visual feedback with considering human intention on master-slave systems", 2016 IEEE International Conference on Robotics and Biomimetics (Robio), IEEE, Dec. 3, 2016, pp. 2169-2174.

Namiki Akio et al: "Vision-based predictive assist control on masterslave systems", 2017 IEEE International Conference on Robotics and Automation (ICRA), IEEE, May 29, 2017, pp. 5357-5362.

Matsumoto Yosuke et al: "Operation assist for a teleoperated robot system controlled with a lightweight and high-operable master device", 2015 IEEE/SICE International Symposium on System Integration (SII), IEEE, Dec. 11, 2015, pp. 552-557.

International Search Report and Written Opinion for International Application Serial No. PCT/JP2022/012089 mailed on Jun. 7, 2022, 27 pages.

Thomas Feix et al., The Grasp Taxonomy of Human Grasp Types, IEEE Transactions on Human-Machine Systems, vol. 46, Issue 1, Feb. 2016.

Chinese Office Action for Chinese Patent Application No. 202280025720.6 mailed Dec. 27, 2025.

* cited by examiner 1
2
5
6a
6b
7a
7b
Us
Tb
obj
222a
222b
222

FIG. 14

| OBJECT | CONTENT OF OPERATION | DEGREE OF FREEDOM TO BE LIMITED (DEGREE OF FREEDOM ASSISTED BY ROBOT) | DEGREE OF FREEDOM ALLOWING OPERATOR TO PERFORM OPERATION |
|---|---|---|---|
| PLASTIC BOTTLE | OPEN CAP | VERTICAL DIRECTION OF OBJECT | ROTATION OF CAP |
| PLASTIC BOTTLE | CLOSE CAP | VERTICAL DIRECTION OF OBJECT | ROTATION OF CAP |
| PIPE | GRIPPING FROM TOP | POSITION ON xy PLANE AND ROTATION AROUND xyz AXES | POSITION ON z-AXIS |
| ... | ... | ... | ... |

FIG. 15

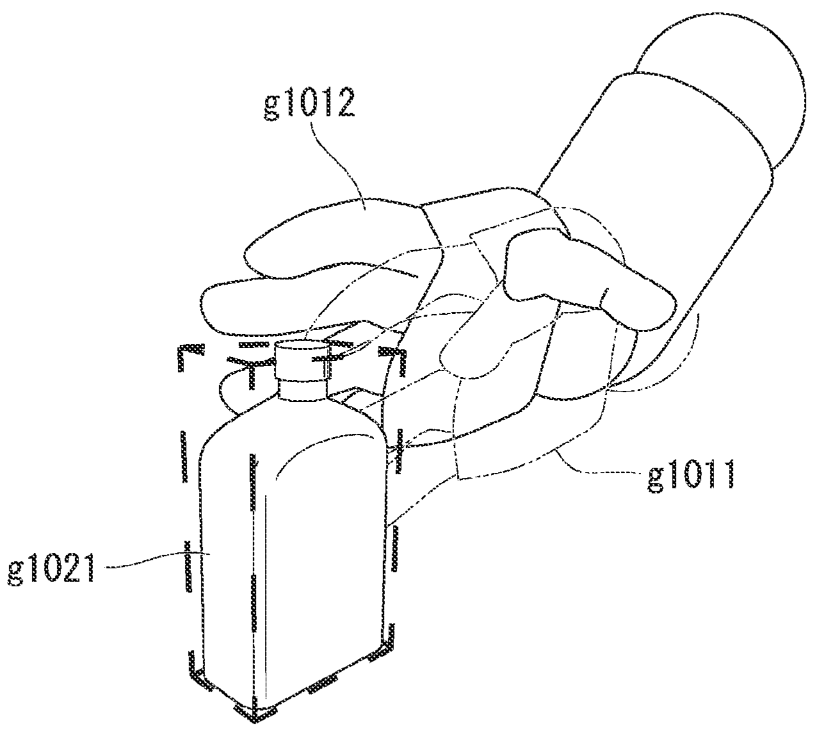

Figure 18:
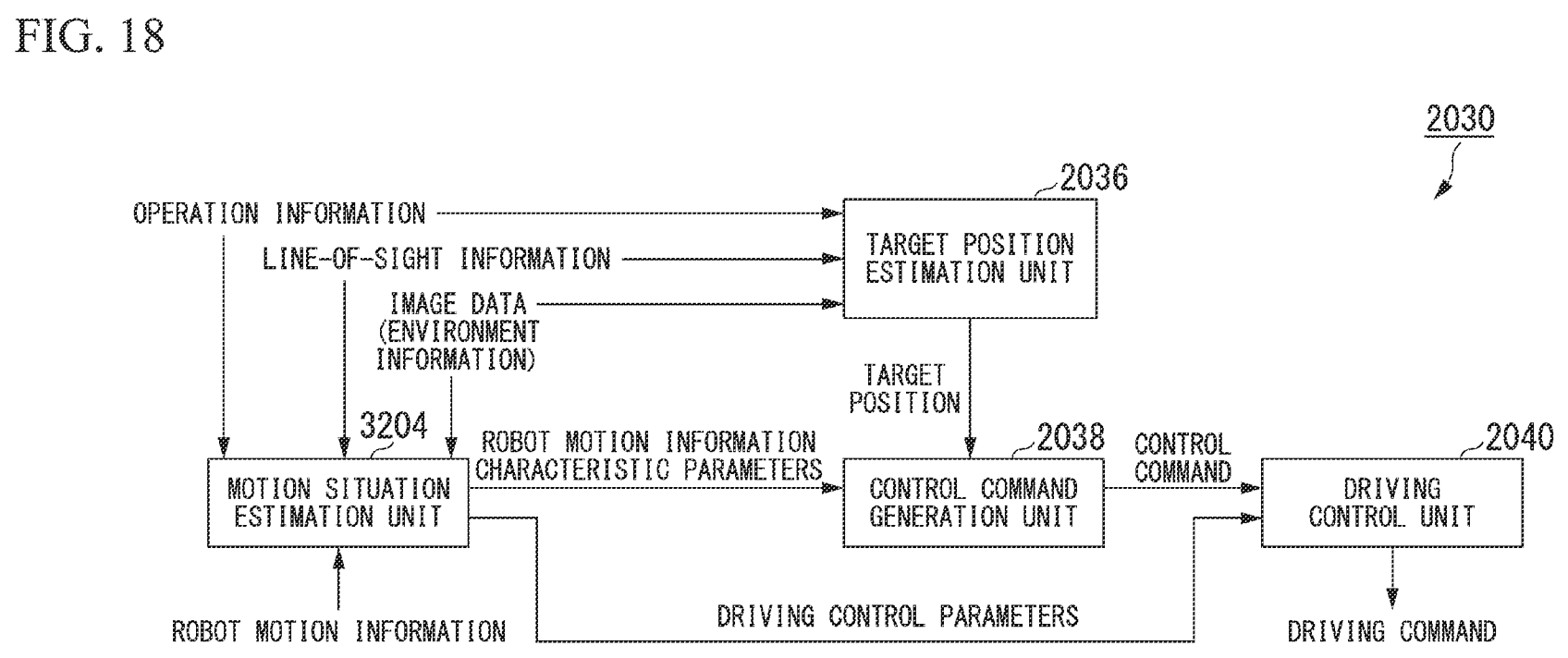

OPERATION INFORMATION
LINE-OF-SIGHT INFORMATION
IMAGE DATA (ENVIRONMENT INFORMATION)
3204
MOTION SITUATION ESTIMATION UNIT
ROBOT MOTION INFORMATION
ROBOT MOTION INFORMATION CHARACTERISTIC PARAMETERS
DRIVING CONTROL PARAMETERS
2036
TARGET POSITION ESTIMATION UNIT
TARGET POSITION
2038
CONTROL COMMAND GENERATION UNIT
CONTROL COMMAND
2040
DRIVING CONTROL UNIT
DRIVING COMMAND

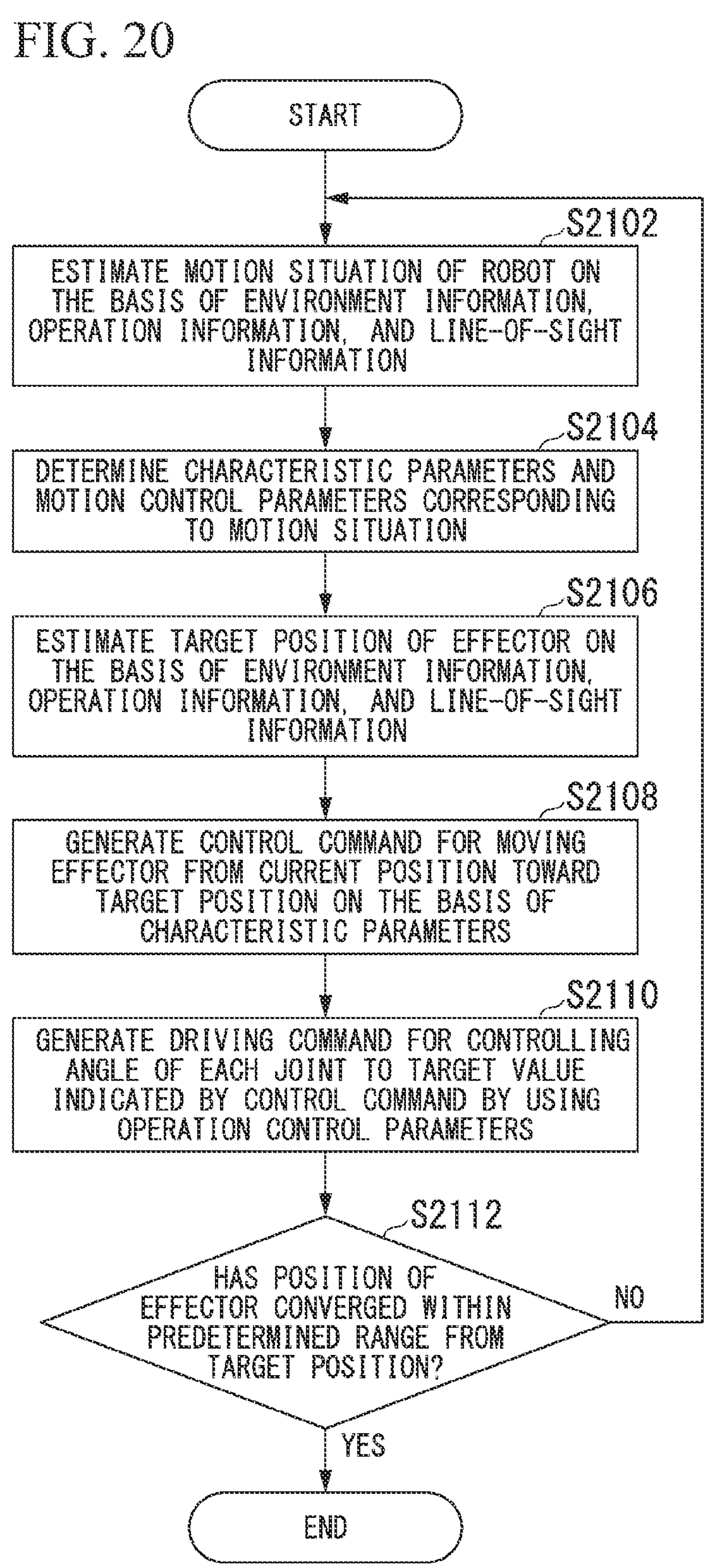
FIG. 20
START
S2102
ESTIMATE MOTION SITUATION OF ROBOT ON THE BASIS OF ENVIRONMENT INFORMATION, OPERATION INFORMATION, AND LINE-OF-SIGHT INFORMATION
S2104
DETERMINE CHARACTERISTIC PARAMETERS AND MOTION CONTROL PARAMETERS CORRESPONDING TO MOTION SITUATION
S2106
ESTIMATE TARGET POSITION OF EFFECTOR ON THE BASIS OF ENVIRONMENT INFORMATION, OPERATION INFORMATION, AND LINE-OF-SIGHT INFORMATION
S2108
GENERATE CONTROL COMMAND FOR MOVING EFFECTOR FROM CURRENT POSITION TOWARD TARGET POSITION ON THE BASIS OF CHARACTERISTIC PARAMETERS
S2110
GENERATE DRIVING COMMAND FOR CONTROLLING ANGLE OF EACH JOINT TO TARGET VALUE INDICATED BY CONTROL COMMAND BY USING OPERATION CONTROL PARAMETERS
S2112
HAS POSITION OF EFFECTOR CONVERGED WITHIN PREDETERMINED RANGE FROM TARGET POSITION?
NO
YES
END

ROBOT REMOTE OPERATION CONTROL DEVICE, ROBOT REMOTE OPERATION CONTROL SYSTEM, ROBOT REMOTE OPERATION CONTROL METHOD, AND PROGRAM

TECHNICAL FIELD

The present invention relates to a robot remote operation control device, a robot remote operation control system, a robot remote operation control method, and a program.

The application is on the basis of Japanese Patent Application No. 2021-058952 filed on Mar. 31, 2021, Japanese Patent Application No. 2021-061137 filed on Mar. 31, 2021, Japanese Patent Application No. 2021-060914 filed on Mar. 31, 2021, and Japanese Patent Application No. 2021-060904 filed on Mar. 31, 2021, and the contents thereof are incorporated herein.

BACKGROUND ART

A control device that allows a user to assist with the operation of a robot has been proposed. As such a control device, for example, a control device including a first information acquisition unit, a second information acquisition unit, and a determination unit has been proposed (see Patent Document 1). The first information acquisition unit acquires first user posture information indicating the posture of a first user who operates a robot, the second information acquisition unit acquires pre-change posture information indicating a pre-change posture which is the posture of the robot before the posture of the robot is changed on the basis of the first user posture information, and the determination unit determines a target posture different from the posture of the first user as the posture of the robot on the basis of the pre-change posture information and the first user posture information acquired by the first information acquisition unit at a point in time when the robot assumes the pre-change posture indicated by the pre-change posture information.

The system disclosed in Patent Document 1 changes the posture of the robot to a posture corresponding to a posture detected by a device worn by an operator.

In order to perform various tasks using a remote-controlled robot, it is necessary to accurately indicate and control 6-degrees-of-freedom hand tip targets (positions and postures) in a three-dimensional space. For example, when the robot is caused to open a cap of a plastic bottle in a state in which the vertical direction of the plastic bottle is not perpendicular to a table, an operator performing a remote operation instructs the robot to turn the cap while aligning a gripping portion with the inclination of the plastic bottle in the vertical direction.

A robot system that receives an operator's motion and controls a robot in accordance with the received motion has previously been proposed. For example, the robot system disclosed in Patent Document 1 acquires first user posture information indicating the posture of a first user who operates a robot, and acquires pre-change posture information indicating a pre-change posture before the posture of the robot is changed on the basis of the first user posture information. The robot system determines a target posture different from the posture of the first user as the posture of the robot on the basis of the pre-change posture information and the first user posture information at a point in time when the robot assumes the pre-change posture indicated by the pre-change posture information.

The robot disclosed in Patent Document 1 includes a robot arm having a plurality of joints. It may be considered that an operator desires to move the robot arm in accordance with a target posture in a three-dimensional space. In this case, the robot system disclosed in Patent Document 1 performs an inverse kinematics calculation to obtain individual control values such as target angles and torques for the respective joints constituting the robot arm and control the motion.

The robot system disclosed in Patent Document 1 acquires user information, which is the basis of the first user posture information, from a user device via a network.

CITATION LIST

Patent Document

[Patent Document 1]
Japanese Patent No. 6476358

SUMMARY OF INVENTION

Technical Problem

However, in the prior art, when a robot is caused to perform predetermined work, it may be difficult for a user who is not skilled in operating the robot to cause the robot to perform the work with high accuracy compared to a user who is skilled in operating the robot.

In the prior art, in order to realize various tasks using a remote-controlled robot, an operator needs to accurately assess situations of a remote robot and an object, and at the same time, advanced operation technology is required. Thus, executable work is limited and the efficiency thereof is reduced.

For this reason, in the prior art, it was difficult for an operator to determine and accurately control 6-degrees-of-freedom (positions and postures) target values in a space during a remote operation, and to perform work.

In addition, there is a trade-off relationship between improving followability to a control target and flexibility of a control target or stability of the solution of an inverse kinematics calculation. According to the inverse kinematics calculation, there is not necessarily a control value, which is a solution, for a control target of a robot as a whole, and there may be a plurality of solutions. Even when there is a solution, the solution is not necessarily stable. On the other hand, a robot is instructed to perform various tasks through operations. In general, for an expected motion depending on a task, the balance between motion characteristics such as flexibility, smoothness, and followability may vary depending on a relationship with the stability of a solution. For example, when the balance between followability and other motion characteristics such as flexibility and smoothness is set in advance, followability can be obtained even when followability is not required. Instead, when a motion which is a stable solution can be obtained, motion characteristics such as flexibility and smoothness may be sacrificed. In contrast, in some cases, motion characteristics such as followability may be lost instead of obtaining flexibility of a motion. This indicates that it is difficult to make settings suitable for every task. In this manner, the fact that a motion expected by operation cannot be obtained may cause a reduction in work efficiency using a robot.

In a robot system, it is important for a robot to follow an operator's motion without a delay in order to improve the efficiency of work and reduce the burden on work. However, a delay cannot be completely eliminated in the control of the robot based on the operator's motion and communication of motion information. On the other hand, a delay in the motion of the robot (following delay) gives the operator a sense of discomfort, resulting in a decrease in work speed and a failure in work, which leads to a reduction in work efficiency.

An aspect of the present invention has been made in view of the above-described problems, and one object thereof is to provide a robot remote operation control device, a robot remote operation control system, a robot remote operation control method, and a program that enable even a user who is not skilled in operating a robot to cause the robot to perform work with high accuracy.

An aspect of the present invention has been made in view of the above-described problems, and an object thereof is to provide a robot remote operation control device, a robot remote operation control system, a robot remote operation control method, and a program that allow an operator to easily perform work.

An aspect of the present invention has been made in view of the above-described points, and an object thereof is to provide a control device, a robot system, a control method, and a program that can improve work efficiency.

An aspect of the present invention has been made in view of the above-described points, and an object thereof is to provide a control device, a robot system, a control method, and a program that can improve a feeling of operation.

Solution to Problem

In order to solve the above-described problems, the present invention adopts the following aspects.

(1) A robot remote operation control device according to an aspect of the present invention includes, in robot remote operation control for an operator to remotely operate a robot capable of gripping an object, an information acquisition unit that acquires operator state information on a state of the operator who operates the robot, an intention estimation unit that estimates a motion intention of the operator who causes the robot to perform a motion, on the basis of the operator state information, and a gripping method determination unit that determines a gripping method for the object on the basis of the estimated motion intention of the operator.

(2) In the aspect (1) described above, the intention estimation unit may classify a posture of the operator on the basis of the operator state information to determine the classification of the posture of the robot and estimate the motion intention of the operator.

(3) In the aspect (1) described above, the intention estimation unit may estimate at least one of a way of gripping an object desired to be gripped and the object desired to be gripped on the basis of the operator state information to estimate the motion intention of the operator.

(4) In the aspect (1) described above, the intention estimation unit may estimate an object desired to be gripped on the basis of the operator state information and estimates a way of gripping the object desired to be gripped and related to the estimated object to estimate the motion intention of the operator.

(5) In the aspect (1) described above, the intention estimation unit may estimate a manner of gripping an object desired to be gripped on the basis of the operator state information, and estimates the object desired to be gripped on the basis of the estimated manner of gripping the object desired to be gripped to estimate the motion intention of the operator.

(6) In any one of the aspects (1) to (5) described above, the operator state information may be at least one of line-of-sight information of the operator, movement information of the operator's arm, and movement information of the operator's head.

(7) In any one of the aspects (1) to (6) described above, the information acquisition unit may acquire position information of the object, and the gripping method determination unit may estimate an object desired to be gripped and a gripping method for the object by also using the acquired position information of the object.

(8) In any one of the aspects (1) to (7) described above, the gripping method determination unit may acquire position information of the gripping portion provided in the robot, and corrects the position information of the gripping portion on the basis of the operator state information.

(9) In the aspect (8) described above, the robot remote operation control device further includes a robot state image creation unit, in which the intention estimation unit may acquire information on the object based on an image captured by the imaging device, and the robot state image creation unit may create an image to be provided to the operator on the basis of the information on the object, the position information of the gripping portion, the operator state information, and the corrected position information of the gripping portion.

(10) A robot remote operation control system according to an aspect of the present invention includes a robot including a gripping portion that grips the object, and a detection unit that detects position information of the gripping portion, the robot remote operation control device according to any one of the aspects (1) to (9), an environment sensor that detects position information of the object, and a sensor that detects operator state information on the state of the operator who operates the robot.

(11) A robot remote operation control method according to an aspect of the present invention is a robot remote operation control method including, in robot remote operation control for an operator to remotely operate a robot capable of gripping an object, causing an information acquisition unit to acquire operator state information on a state of the operator who operates the robot, causing an intention estimation unit to estimate a motion intention of the operator who causes the robot to perform a motion, on the basis of the operator state information, and causing a gripping method determination unit to determine a gripping method for the object on the basis of the estimated motion intention of the operator.

(12) A program according to an aspect of the present invention is a program causing a computer to execute operations, in robot remote operation control for an operator to remotely operate a robot capable of gripping an object, the operations including acquiring operator state information on a state of the operator who operates the robot, estimating a motion intention of the operator who causes the robot to perform a motion, on the basis of the operator state information, and determining a gripping method for the object on the basis of the estimated motion intention of the operator.

(13) A robot remote operation control device according to an aspect of the present invention is a robot remote operation control device including, in a robot remote operation of recognizing movement of an operator and transmitting the movement of the operator to a robot to operate the robot, an intention estimation unit that estimates a motion of the operator on the basis of a robot environment sensor value obtained by the robot or an environment sensor installed in an environment surrounding the robot, and an operator sensor value which is the movement of the operator obtained by an operator sensor, and a control command generation unit that generates a control command by reducing the degree of freedom of the motion of the operator by generating an appropriate control command for the degree of freedom of a portion of the operator's motion on the basis of the estimated motion of the operator.

(14) In the aspect (13) described above, the control command generation unit may limit the degree of freedom to be controlled by the operator and a controllable range, and performs motion assistance on the limited degree of freedom in the operator's operation instruction given to the robot.

(15) In the aspect (13) or (14) described above, the control command generation unit may not reduce the degree of freedom of the operator's motion when a distance between the gripping unit provided in the robot and a target object to be operated by the operator falls outside a predetermined range, and does not reduce the degree of freedom of the operator's motion when the distance between the gripping unit provided in the robot and the target object to be operated by the operator falls within the predetermined range, and the robot environment sensor value may have captured image information and depth information.

(16) In any one of the aspects (13) to (15) described above, the intention estimation unit may estimate the operator's motion by inputting the robot environment sensor value and the operator sensor value to a learned intention estimation model.

(17) In any one of the aspects (13) to (16) described above, the operator sensor value may be at least one of line-of-sight information of the operator and operator arm information which is information on the posture and position of the operator's arm.

(18) In any one of the aspects (13) to (17) described above, the robot environment sensor value may have captured image information and depth information.

(19) A robot remote operation control system according to an aspect of the present invention is a robot remote operation control system including, in a robot remote operation of recognizing movement of an operator and transmitting the movement of the operator to a robot to operate the robot, the robot remote operation control device according to any one of (13) to (18) described above, a gripping portion that grips an object, an environment sensor that is installed in the robot or in an environment surrounding the robot and that detects a robot environment sensor value, and an operator sensor that detects the operator's movement as an operator sensor value.

(20) A robot remote operation control method according to an aspect of the present invention is a robot remote operation control method including, in a robot remote operation of recognizing movement of an operator and transmitting the movement of the operator to a robot to operate the robot, causing an intention estimation unit to estimate a motion of the operator on the basis of a robot environment sensor value obtained by the robot or an environment sensor installed in an environment surrounding the robot, and an operator sensor value which is the movement of the operator obtained by an operator sensor, and causing a control command generation unit to generate a control command by reducing the degree of freedom of the motion of the operator by generating an appropriate control command for the degree of freedom of a portion of the operator's motion on the basis of the estimated motion of the operator.

(21) A program according to an aspect of the present invention is a program causing a computer to execute operations, in a robot remote operation of recognizing movement of an operator and transmitting the movement of the operator to a robot to operate the robot, the operations including estimating a motion of the operator on the basis of a robot environment sensor value obtained by the robot or an environment sensor installed in an environment surrounding the robot, and an operator sensor value which is the movement of the operator obtained by an operator sensor, and generating a control command by reducing the degree of freedom of the motion of the operator by generating an appropriate control command for the degree of freedom of a portion of the operator's motion on the basis of the estimated motion of the operator.

(22) A control device according to an aspect of the present invention includes a motion situation estimation unit that estimates a motion situation of the robot on the basis of at least environment information indicating a motion environment of the robot and operation information indicating an operation situation, a control command generation unit that generates a control command for operating an effector of the robot on the basis of the operation information, and a driving control unit that controls a motion of the robot on the basis of the control command, in which the control command generation unit determines the control command on the basis of characteristic parameters related to control characteristics corresponding to the motion situation.

(23) In the aspect (22) described above, the motion situation estimation unit may further estimate the motion situation on the basis of operator information indicating the situation of the operator who operates the robot.

(24) In the aspect (22) or (23) described above, the control device may further include a target position estimation unit that estimates a target position of the effector on the basis of at least the operation information and the environment information.

(25) In the aspect (24) described above, the control command generation unit may determine an operation amount for driving the effector toward the target position on the basis of the characteristic parameters, and the characteristic parameters may include a convergence determination parameter indicating a convergence determination condition for the target position.

(26) In the aspect (25) described above, the control command generation unit may determine the operation amount on the basis of an objective function indicating a load for operating the effector toward the target position, the objective function may be a function obtained by synthesizing a plurality of types of factors, and the characteristic parameters may include a weight for each factor.

(27) In the aspect (25) or (26) described above, the driving control unit may determine the operation amount so that a deviation between a target value based on the control command and an output value from a motion mechanism that drives the effector is reduced on the basis of the characteristic parameters, and the characteristic parameters may include a gain of the deviation with respect to the operation amount.

(28) A program according to an aspect of the present invention causes a computer to function as the control device according to any one of the aspects (22) to (27) described above.

(29) A robot system according to an aspect of the present invention includes the control device according to any one of the aspects (22) to (27) described above and the robot.

(30) A control method according to an aspect of the present invention is a control method in a control device, the control method including causing the control device to execute a first step of estimating a motion situation of the robot on the basis of at least environment information indicating a motion environment of the robot and operation information indicating an operation situation, a second step of generating a control command for operating an effector of the robot on the basis of the operation information, and a third step of controlling the motion of the robot on the basis of the control command, in which the second step includes determining the control command on the basis of characteristic parameters related to control characteristics corresponding to the motion situation.

(31) A control device according to an aspect of the present invention includes a trajectory prediction unit that determines a predicted trajectory of an effector of a robot from a current time to a predicted time after a predetermined predicted period of time, on the basis of at least motion information indicating a motion of the robot and operation information indicating an operation situation, and a control command generation unit that generates a control command on the basis of the predicted trajectory.

(32) In the aspect (31) described above, the control device may further include a motion situation estimation unit that estimates a motion situation of the robot on the basis of at least environment information indicating a motion environment of the robot and the operation information, in which the trajectory prediction unit may determine the predicted period of time on the basis of the motion situation.

(33) In the aspect (32) described above, the control device may further include a driving control unit that determines an operation amount for the motion mechanism on the basis of a target value of displacement of a motion mechanism of the robot that gives a target position of the effector for each time constituting the predicted trajectory, in which the motion situation estimation unit may determine a gain of the target value on the basis of the motion situation.

(34) In the aspect (33) described above, the driving control unit may determine the operation amount by synthesizing a first component based on a first gain and a deviation between an output value of the displacement that gives a current position of the effector and the target value, and a second component based on the target value and a second gain, and the motion situation estimation unit may determine the first gain and the second gain on the basis of the motion situation.

(35) In any one of the aspects (32) to (34) described above, the motion situation estimation unit may further estimate the motion situation on the basis of operator information indicating the situation of the operator who operates the robot.

(36) A program according to an aspect of the present invention causes a computer to function as the control device according to any one of the aspects (31) to (34) described above.

(37) A robot system according to an aspect of the present invention includes the control device according to any one of the aspects (31) and (34) described above and the robot.

(38) A control method according to an aspect of the present invention is a control method in a control device, the control method including a first step of determining a predicted trajectory of an effector of a robot from a current time to a predicted time after a predetermined predicted period of time, on the basis of at least motion information indicating a motion of the robot and operation information indicating an operation situation, and a second step of generating a control command on the basis of the predicted trajectory.

Advantageous Effects of Invention

According to the above-described aspects (1) to (12), since a target object can be picked up without the need for accurate positioning by an operator, even users who are not skilled in operating a robot can cause the robot to perform work with high accuracy.

According to the above-described aspects (2) to (5), it is possible to estimate the operator's intention with high accuracy by estimating the operator's motion intention on the basis of the movement of the operator's arm including the hand and fingers.

According to the above-described aspect (8), the position information of the gripping portion is corrected on the basis of the actual position of the gripping portion of the robot and the state of the operator, and thus it is possible to realize picking-up of a target object even when the operator does not perform accurate positioning.

According to the above-described aspect (9), an image based on the corrected position information of the gripping portion can be provided to the operator, and thus the operator easily remotely operates the robot.

According to the above-described aspects (13) to (21), the degree of freedom to be controlled by the operator is limited by substituting generation of control target values of some of six degrees of freedom depending on a situation, and thus it becomes easier for the operator to perform work.

According to the above-described aspects (22), (28), (29), and (30), the motion of the effector is controlled using the operation information in accordance with the motion situation estimated on the basis of the motion environment and the operation situation. Since the effector is operated depending on the motion situation, the working efficiency of the robot is improved.

According to the above-described aspect (23), the motion situation is accurately estimated by further referring to the operator's situation. For this reason, the working efficiency of the robot is further improved.

According to the above-described aspect (24), the motion of the robot is controlled such that the effector moves toward the target position determined on the basis of the motion environment and the operation situation. Since the operator does not need to perform an operation for accurately indicating the target position, the work efficiency of the robot is further improved.

According to the above-described aspect (25), the convergence determination condition for determining that the position of the effector has converged to the target position is determined in accordance with the motion situation. For this reason, it is possible to realize position accuracy or solution stability that is required or expected depending on the motion situation.

According to the above-described aspect (26), a weight on a load factor related to the motion of the effector is determined in accordance with the motion situation. For this reason, it is possible to adjust motion characteristics so that the types of factors required or expected depending on the motion situation are reduced.

According to the above-described aspect (27), the gain for the operation amount of the deviation between the target value and the output value is adjusted in accordance with a motion situation. Since the speed at which the effector is moved to the target position can be adjusted in accordance with the motion situation, the efficiency of work using the robot is improved.

According to the above-described aspects (31), (36), (37), and (38), the effector of the robot is driven in response to the control command generated on the basis of the predicted trajectory of the effector by the predicted time after the current time. For this reason, a delay until the operation is reflected in the robot's motion is reduced or eliminated. Since the feeling of operation is improved for the operator, it is possible to achieve both an improvement in work efficiency and a reduction in burden.

According to the above-described aspect (32), the predicted period of time is determined in accordance with the motion situation of the robot which is estimated from the motion environment and operation situation of the robot. For this reason, the balance between an improvement in the feeling of operation and the accuracy of the position of the effector to be controlled is adjusted in accordance with the motion situation.

According to the above-described aspect (33), the contribution of the target values to the operation amount for the motion mechanism is adjusted in accordance with the motion situation. For this reason, the sensitivity of the motion of the effector for the operator's operation is adjusted in accordance with the motion situation.

According to the above-described aspect (34), the balance between a feedback term and a feedforward term is adjusted in accordance with the motion situation. For this reason, the balance between the sensitivity and accuracy of the motion of the effector for the operator's operation is adjusted in accordance with the motion situation. According to the above-described aspect (35), the motion situation is accurately estimated by further referring to the operator's situation. For this reason, reductions in work efficiency and a burden on work of the robot are further promoted.

BRIEF DESCRIPTION OF DRAWINGS

FIG. 14 is a diagram illustrating an example of information stored in a storage unit according to the embodiment.

FIG. 15 is a diagram illustrating an example of correction of a hand tip target of a gripping position with the assistance of the robot remote operation control device.

FIG. 18 is a block diagram illustrating a functional configuration example of a portion of a control device according to the third embodiment.

FIG. 20 is a flowchart illustrating an example of motion control processing according to the third embodiment.

DESCRIPTION OF EMBODIMENTS

First Embodiment

Figure 1:
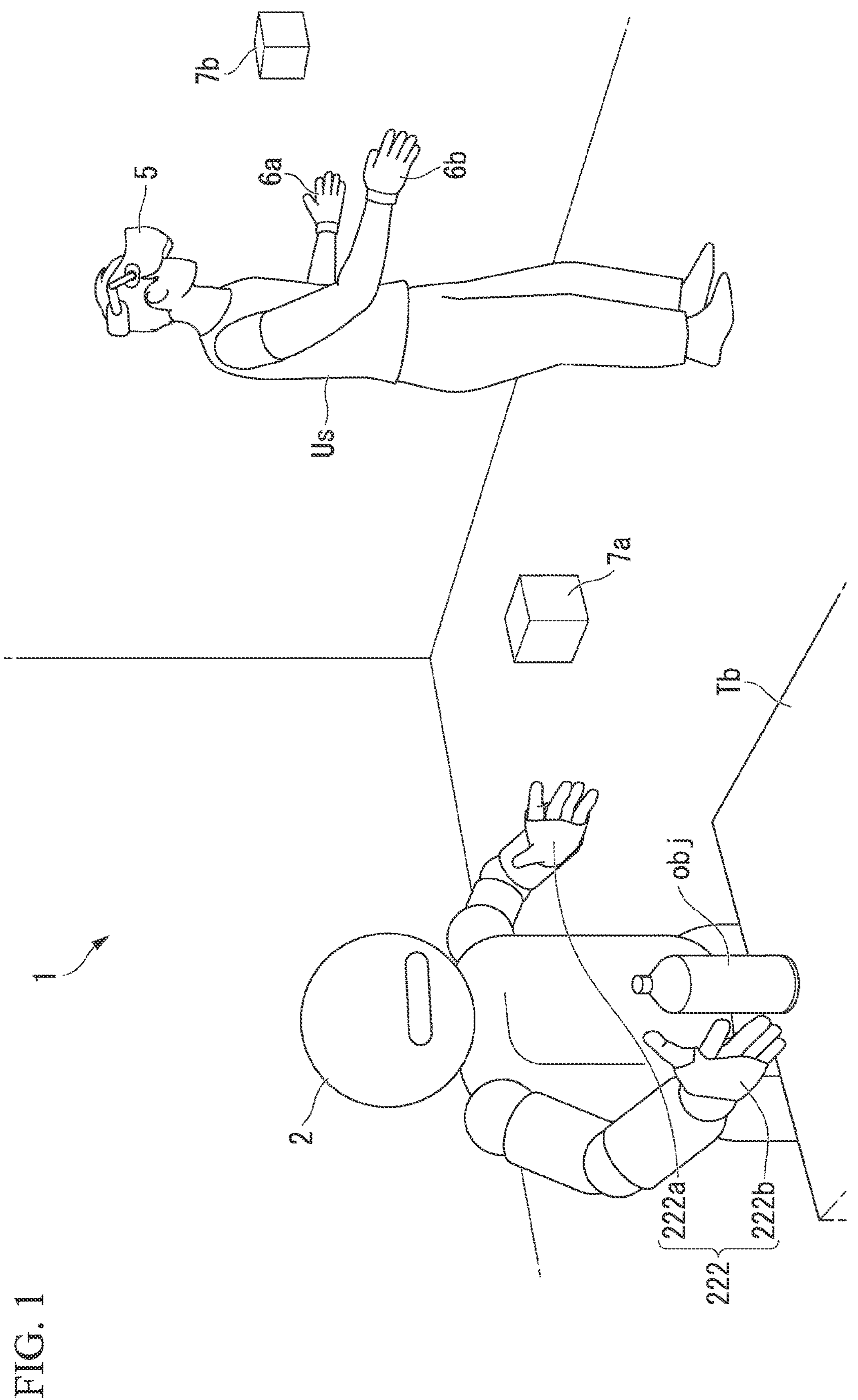
FIG. 1 is a diagram illustrating an outline of a robot remote operation control system and an outline of work according to an embodiment.

Hereinafter, embodiments of the present invention will be described with reference to the drawings. In the drawings used in the following description, the scale of each member is appropriately changed so that each member has a recognizable size.

Outline

First, an outline of work and processing performed by a robot remote operation control system will be described.

FIG. 1 is a diagram illustrating an outline of a robot remote operation control system 1 and an outline of work according to the present embodiment. As illustrated in FIG. 1, an operator Us is wearing, for example, a head mounted display (HMD) 5 and controllers 6 (6*a*, 6*b*). An environment sensor 7*a* and an environment sensor 7*b* are installed in a work space. The environment sensors 7 may be attached to a robot 2. The robot 2 also includes gripping portions 222 (222*a*, 222*b*). Each of the environment sensors 7 (7*a*, 7*b*) includes, for example, an RBG camera and a depth sensor as described later. The operator Us remotely operates the robot 2 by moving the hand or fingers wearing the controller 6 while viewing an image displayed on the HMD 5. In the example of FIG. 1, the operator Us remotely operates the robot 2 to cause the robot to grip a plastic bottle obj on a table Tb. In the remote operation, the operator Us cannot directly view the motion of the robot 2, but can indirectly view a video on the robot 2 side through the HMD 5. In the present embodiment, the robot remote operation control device 3 provided in the robot 2 acquires information on the state of the operator who operates the robot 2 (operator state information), estimates an object to be gripped and a gripping method on the basis of the acquired operator state information, and determines an object gripping method on the basis of the estimation.

Configuration Example of Robot Remote Operation Control System

Next, a configuration example of the robot remote operation control system 1 will be described.

Figure 2:
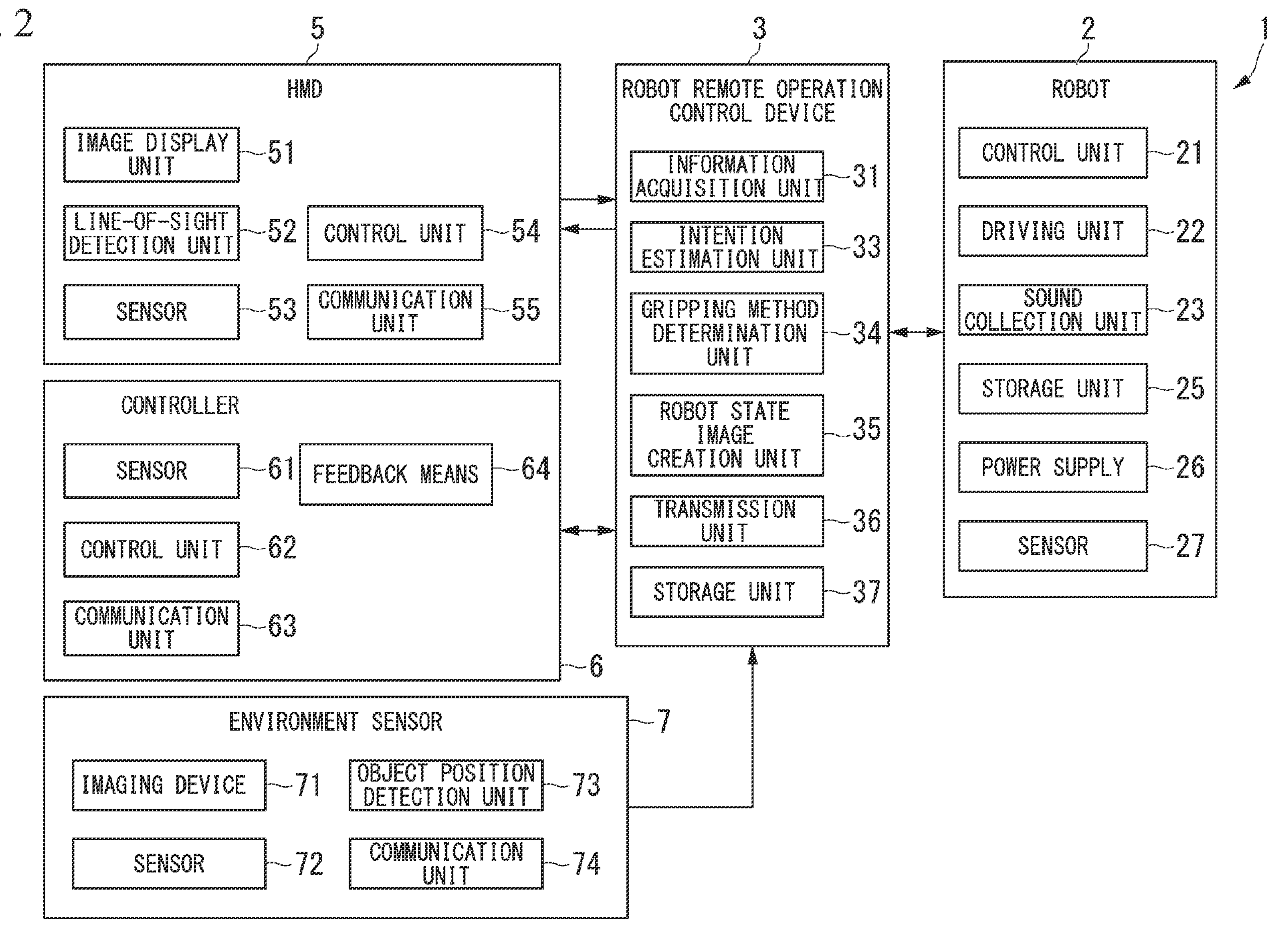
FIG. 2 is a block diagram illustrating a configuration example of the robot remote operation control system according to the embodiment.

FIG. 2 is a block diagram illustrating a configuration example of the robot remote operation control system 1 according to the present embodiment. As illustrated in FIG. 2, the robot remote operation control system 1 includes the robot 2, a robot remote operation control device 3, the HMD 5, the controllers 6, and the environment sensors 7.

The robot 2 includes, for example, a control unit 21, a driving unit 22, a sound collection unit 23, a storage unit 25, a power supply 26, and a sensor 27.

The robot remote operation control device 3 includes, for example, an information acquisition unit 31, an intention estimation unit 33, a gripping method determination unit 34, a robot state image creation unit 35, a transmission unit 36, and a storage unit 37.

The HMD 5 includes, for example, an image display unit 51, a line-of-sight detection unit 52, a sensor 53, a control unit 54, and a communication unit 55.

The controller 6 includes, for example, a sensor 61, a control unit 62, a communication unit 63, and feedback means 64.

The environment sensor 7 includes, for example, an imaging device 71, a sensor 72, an object position detection unit 73, and a communication unit 74.

The robot remote operation control device 3 and the HMD 5 are connected, for example, via a wireless or wired network. The robot remote operation control device 3 and the controller 6 are connected, for example, via a wireless or wired network. The robot remote operation control device 3 and the environment sensor 7 are connected, for example, via a wireless or wired network. The robot remote operation control device 3 and the robot 2 are connected, for example, via a wireless or wired network. The robot remote operation control device 3 and the HMD 5 may be directly connected without going through a network. The robot remote operation control device 3 and the controller 6 may be directly connected without going through a network. The robot remote operation control device 3 and the environment sensor 7 may be directly connected without going through a network. The robot remote operation control device 3 and the robot 2 may be directly connected without going through a network.

Functional Example of Robot Remote Operation Control System

Next, a functional example of the robot remote operation control system will be described with reference to FIG. 1.

The HMD 5 displays a robot state image received from the robot remote operation control device 3. The HMD 5 detects the movement of the operator's line of sight, the movement of the head, and the like, and transmits the detected operator state information to the robot remote operation control device 3.

The image display unit 51 displays the robot state image received from the robot remote operation control device 3 under the control of the control unit 54.

The line-of-sight detection unit 52 detects the line-of-sight of the operator and outputs the detected line-of-sight information (operator sensor value) to the control unit 54.

The sensor 53 is, for example, an acceleration sensor, a gyroscope, or the like, detects a motion and inclination of the operator's head, and outputs the detected head movement information (operator sensor value) to the control unit 54.

The control unit 54 transmits line-of-sight information detected by the line-of-sight detection unit 52 and head motion information detected by the sensor 53 to the robot remote operation control device 3 via the communication unit 55. The control unit 54 causes the image display unit 51 to display the robot state image transmitted by the robot remote operation control device 3.

The communication unit 55 receives the robot state image transmitted by the robot remote operation control device 3 and outputs the received robot state image to the control unit 54. The communication unit 55 transmits line-of-sight information and head motion information to the robot remote operation control device 3 under the control of the control unit 54.

The controller 6 is, for example, a tactile data glove worn on the operator's hand. The controller 6 detects orientation, movement of each finger, and movement of the hand using the sensor 61, and transmits the detected operator state information to the robot remote operation control device 3.

The sensor 61 is, for example, an acceleration sensor, a gyroscope sensor, a magnetic force sensor, or the like. The sensor 61, which includes a plurality of sensors, tracks the movement of each finger using, for example, two sensors. The sensor 61 detects operator arm information (operator sensor value, operator state information), which is information on the posture and position of the operator's arm such as orientation, movement of each finger, and movement of the hand, and outputs the detected operator arm information to the control unit 62. The operator arm information includes information on the entire human arm, such as hand tip position/posture information, angle information on each finger, elbow position/posture information, and movement tracking information on each part.

The control unit 62 transmits the operator arm information to the robot remote operation control device 3 via the communication unit 63. The control unit 62 controls the feedback means 64 on the basis of the feedback information.

The communication unit 63 transmits line-of-sight information and operator arm information to the robot remote operation control device 3 under the control of the control unit 62. The communication unit 63 acquires the feedback information transmitted by the robot remote operation control device 3 and outputs the acquired feedback information to the control unit 62.

The feedback means 64 feeds back feedback information to the operator under the control of the control unit 62. The feedback means 64 feeds back sensations to the operator through, for example, means for applying vibration (not illustrated), means for applying air pressure (not illustrated), means for restricting hand movement (not illustrated), means for feeling temperature (not illustrated), means for feeling hardness or softness (not illustrated), and the like, which are attached to the gripping portion 222 of the robot 2, in accordance with the feedback information.

The environment sensor 7 is installed, for example, at a position where the work of the robot 2 can be imaged and detected. The environment sensor 7 may be provided in the robot 2 or may be attached to the robot 2. Alternatively, a plurality of environment sensors 7 may be provided, and may be installed in the work environment and attached to the robot 2 as illustrated in FIG. 1. The environment sensor 7 transmits object position information (environment sensor value), a captured image (environment sensor value), and a detected sensor value (environment sensor value) to the robot remote operation control device 3. The environment sensor 7 may be a motion capture device, and may detect position information of an object by capturing a motion. Alternatively, a GPS receiver (not illustrated) including a position information transmission unit may be attached to the object. In this case, the GPS receiver may transmit position information to the robot remote operation control device 3.

The imaging device 71 is, for example, an RGB camera. In the environment sensor 7, a positional relationship between the imaging device 71 and the sensor 72 is known.

The sensor 72 is, for example, a depth sensor. The imaging device 71 and the sensor 72 may be distance sensors.

The object position detection unit 73 detects a three-dimensional position, size, shape, and the like of a target object in a captured image by a well-known method on the basis of the captured image and detection results detected by the sensor. The object position detection unit 73 performs image processing (edge detection, binarization processing, feature amount extraction, image emphasizing processing, image extraction, pattern matching processing, and the like) on the image captured by the imaging device 71 to estimate the position of the object with reference to a pattern matching model or the like stored in the object position detection unit 73. When a plurality of objects are detected from the captured image, the object position detection unit 73 detects the position of each object. The object position detection unit 73 transmits the detected object position information (environment sensor value), the captured image (environment sensor value), and the sensor value (environment sensor value) to the robot remote operation control device 3 via the communication unit 74.

The communication unit 74 transmits the object position information to the robot remote operation control device 3. The communication unit 74 transmits the object position information (environment sensor value), the captured image (environment sensor value), and the sensor value (environment sensor value) to the robot remote operation control device 3.

The action of the robot 2 is controlled under the control of the control unit 21 when the robot 2 is not remotely operated. When the robot 2 is remotely operated, the action of the robot 2 is controlled in accordance with gripping plan information generated by the robot remote operation control device 3.

The control unit 21 controls the driving unit 22 on the basis of gripping method information output by the robot remote operation control device 3. The control unit 21 performs sound recognition processing (utterance section detection, sound source separation, sound source localization, noise suppression, sound source identification, and the like) on acoustic signals collected by the sound collection unit 23. When a result of sound recognition includes a motion instruction for the robot, the control unit 21 may control the motion of the robot 2 on the basis of the motion instruction using a sound. On the basis of information stored in the storage unit 25, the control unit 21 performs image processing (edge detection, binarization processing, feature amount extraction, image emphasizing processing, image extraction, pattern matching, and the like) on an image captured by the environment sensor 7. Data transmitted by the environment sensor 7 may be, for example, a point group having position information. The control unit 21 extracts information on an object (object information) from a captured image through image processing. The object information includes, for example, information such as the name of the object and the position of the object. The control unit 21 controls the driving unit 22 on the basis of a program stored in the storage unit 25, a sound recognition result, and an image processing result. The control unit 21 outputs motion state information of the robot 2 to the robot state image creation unit 35. The control unit 21 generates feedback information and transmits the generated feedback information to the controller 6 via the robot remote operation control device 3.

The driving unit 22 drives each unit (arms, fingers, legs, head, torso, waist, and the like) of the robot 2 under the control of the control unit 21. The driving unit 22 includes, for example, an actuator, a gear, an artificial muscle, and the like.

The sound collection unit 23 is, for example, a microphone array including a plurality of microphones. The sound collection unit 23 outputs the collected acoustic signals to the control unit 21. The sound collection unit 23 may have a sound recognition processing function. In this case, the sound collection unit 23 outputs a sound recognition result to the control unit 21.

The storage unit 25 stores, for example, programs, threshold values, and the like used for control performed by the control unit 21. The storage unit 37 may also serve as the storage unit 25. Alternatively, the storage unit 37 may also serve as the storage unit 25.

The power supply 26 supplies power to each part of the robot 2. The power supply 26 may include, for example, a rechargeable battery or a charging circuit.

The sensor 27 is, for example, an acceleration sensor, a gyroscope sensor, a magnetic force sensor, each joint encoder, and the like. The sensor 27 is attached to each joint, head, and the like of the robot 2. The sensor 27 outputs detected results to the control unit 21, the intention estimation unit 33, the gripping method determination unit 34, and the robot state image creation unit 35.

The information acquisition unit 31 acquires line-of-sight information and head motion information from the HMD 5, acquires operator arm information from the controller 6, acquires environment sensor values (object position information, sensor values, and images) from the environment sensor 7, and outputs the acquired operator state information to the intention estimation unit 33 and the robot state image creation unit 35.

The intention estimation unit 33 estimates the operator's motion intention on the basis of information acquired by the information acquisition unit 31. The intention estimation unit 33 estimates the operator's motion intention using at least one of the line-of-sight information, the operator arm information, and the head motion information. The intention estimation unit 33 may perform intention estimation also using the environment sensor values. The operator's motion intention will be described later.

The gripping method determination unit 34 determines an object gripping method on the basis of a motion intention estimated by the intention estimation unit 33, a detection result detected by the sensor 27, and an image processing result of an image captured by the imaging device 71. The gripping method determination unit 34 outputs the determined gripping method information to the control unit 21.

The robot state image creation unit 35 performs image processing (edge detection, binarization, feature amount extraction, image emphasis, image extraction, clustering processing, and the like) on an image captured by the imaging device 71. The robot state image creation unit 35 estimates the position, movement of a hand of the robot 2 on the basis of the gripping method information estimated by the gripping method determination unit 34, the image processing result, the motion state information of the robot 2 output by the control unit 21, and the like, estimates the movement of the operator's hand, and creates a robot state image to be displayed on the HMD 5 on the basis of the estimated result. The robot state image may include information on processing to be performed by the robot remote operation control device 3, error information, and system state information indicating the state of the system.

The transmission unit 36 transmits a robot state image created by the robot state image creation unit 35 to the HMD 5. The transmission unit 36 acquires feedback information output by the robot 2 and transmits the acquired feedback information to the controller 6.

The storage unit 37 stores a template used by the intention estimation unit 33 for estimation, a trained model used for estimation, and the like. The storage unit 37 temporarily stores sound recognition results, image processing results, gripping method information, and the like. The storage unit 37 stores model images to be compared in pattern matching processing of image processing.

Example of State Where Operator is Wearing HMD 5 and Controller 6

Next, an example of a state in which the operator is wearing the HMD 5 and the controller 6 will be described.

Figure 3:
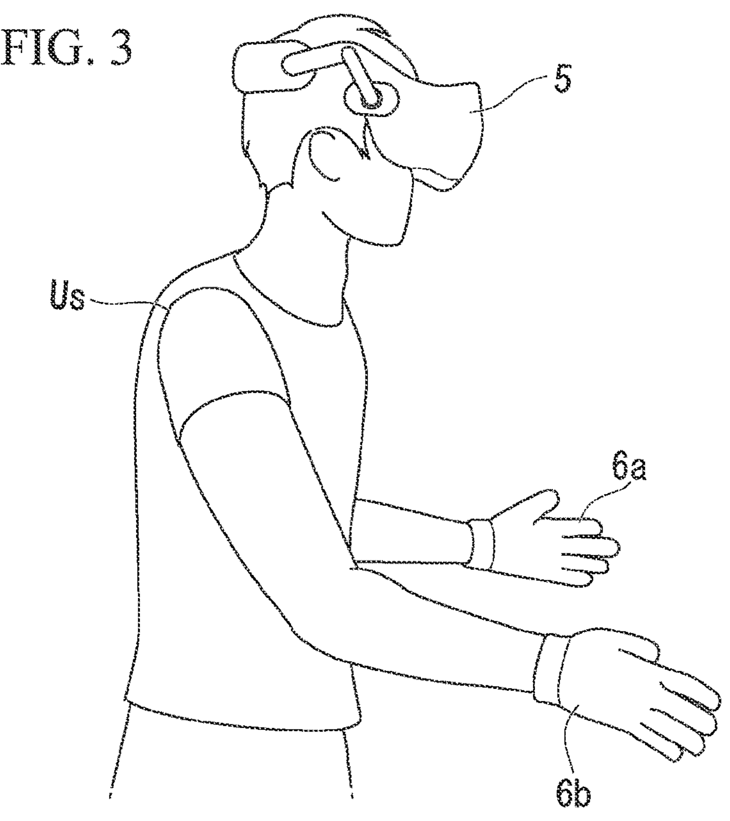
FIG. 3 is a diagram illustrating an example of a state in which an operator wears an HMD and a controller.

FIG. 3 is a diagram illustrating an example of a state in which the operator is wearing the HMD 5 and the controller 6. In the example of FIG. 3, the operator Us is wearing a controller 6*a* on his or her left hand, a controller 6*b* on his or her right hand, and the HMD 5 on his or her head. The HMD 5 and the controller 6 illustrated in FIG. 3 are examples, and a wearing method, shape, and the like are not limited thereto.

[Operator State Information]

Next, operator state information acquired by the information acquisition unit 31 will be further described.

The operator state information is information that represents the state of the operator. The operator state information includes line-of-sight information of the operator, movement and position information of the operator's finger, and movement and position information of the operator's hand.

The HMD 5 detects the line-of-sight information of the operator.

The movement and position information of the operator's finger and the movement and position information of the operator's hand are detected by the controller 6.

Example of Information Estimated by Intention Estimation Unit 33

Next, an example of information estimated by the intention estimation unit 33 will be described.

The intention estimation unit 33 estimates the operator's motion intention on the basis of the acquired operator state information. The operator's motion intention is, for example, the purpose of work that the robot 2 is desired to perform, the content of the work that the robot 2 is desired to perform, the movements of the hand and the finger at each time, and the like. The intention estimation unit 33 classifies the posture of the arm of the robot 2 including the gripping portion 222 by classifying the postures of the arm of the operator on the basis of operator sensor values of the controller 6. The intention estimation unit 33 estimates the intention of a motion that the operator desires the robot to perform on the basis of a classification result. The intention estimation unit 33 estimates, for example, how to grip an object and an object desired to be gripped as the operator's motion intention. The purpose of work is, for example, gripping an object, moving an object, or the like. The content of work includes, for example, gripping and lifting an object, gripping and moving an object, and the like.

The intention estimation unit 33 estimates the operator's motion intention, for example, by a GRASP Taxonomy method (see, for example, Reference Literature 1).

In the present embodiment, the operator's state is classified by classifying the posture of the operator or the robot 2, that is, the gripping posture, for example, by the GRASP taxonomy method to estimate the operator's motion intention. The intention estimation unit 33 estimates the operator's motion intention, for example, by inputting the operator state information to a learned model stored in the storage unit 37. In the present embodiment, it is possible to accurately estimate the operator's motion intention by estimating the intention on the basis of the classification of the gripping posture. Another method may be used to classify the gripping posture.

Reference Literature 1; Thomas Feix, Javier Romero, others, "The GRASP Taxonomy of Human Grasp Types" IEEE Transactions on Human-Machine Systems (Volume: 46, Issue: 1, February 2016), IEEE, p 66-77

In addition, the intention estimation unit 33 may make an integral estimation using the line of sight and the movement of the arm. In this case, the intention estimation unit 33 may input line-of-sight information, hand movement information, and position information of an object on the table to a trained model to estimate the operator's motion intention.

The intention estimation unit 33 first estimates a gripped object, for example, on the basis of the operator state information. The intention estimation unit 33 estimates the gripped object, for example, on the basis of the line-of-sight information. Next, the intention estimation unit 33 estimates the posture of the operator's hand on the basis of the estimated object to be gripped.

Alternatively, the intention estimation unit 33 first estimates the posture of the operator's hand, for example, on the basis of the operator state information. Next, the intention estimation unit 33 estimates an object that the operator desires to grip from the estimated posture of the operator's hand. For example, when three objects are placed on the table, the intention estimation unit 33 estimates which of the three objects is a gripping candidate on the basis of the posture of the hand.

The intention estimation unit 33 may estimate the future trajectory of the hand tip intended by the operator in advance on the basis of the operator state information and the state information of the robot 2.

The intention estimation unit 33 may also estimate an object to be gripped and the position of the object by using a detection result detected by the sensor 27, an image processing result of an image captured by the environment sensor 7, and the like.

Since a coordinate system differs between an operator operation environment and a robot motion environment, for example, the operator operation environment and the robot motion environment may be calibrated when the robot 2 is activated.

During gripping, the robot remote operation control device 3 may determine a gripping position in consideration of an error of the gripping position at the time of gripping on the basis of a gripping force of the robot 2, a frictional force between the object and the gripping portion, and the like.

Processing Example of Robot 2 and Robot Remote Operation Control Device 3

Next, a processing example of the robot 2 and the robot remote operation control device 3 will be described.

Figure 4:
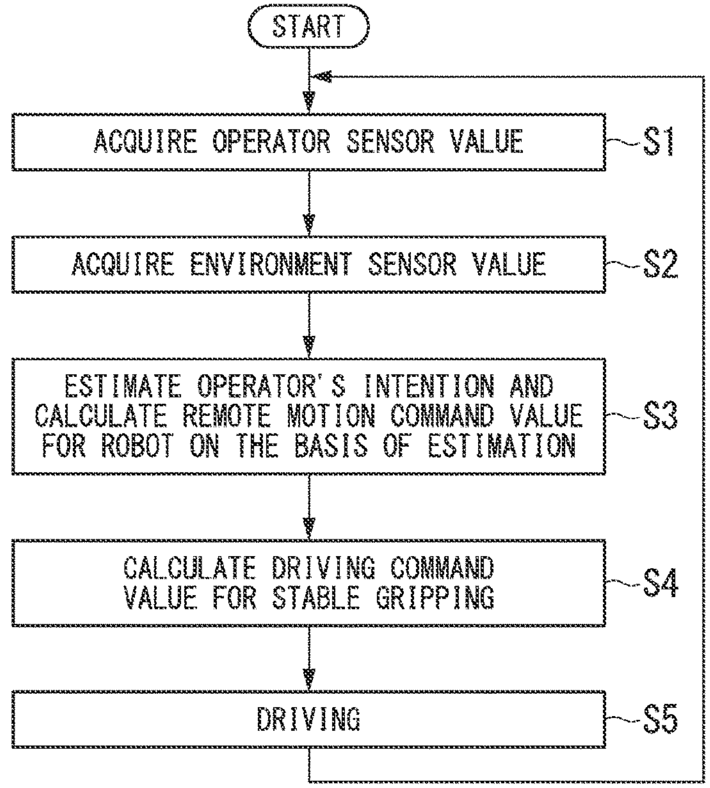
FIG. 4 is a diagram illustrating an example of a processing procedure of a robot and the robot remote operation control device according to the embodiment.

FIG. 4 is a diagram illustrating an example of a processing procedure of the robot 2 and the robot remote operation control device 3 according to the present embodiment.

(Step S1) The information acquisition unit 31 acquires line-of-sight information (operator sensor value) and head motion information (operator sensor value) from the HMD 5, and acquires operator arm information (operator sensor value) from the controller 6.

(Step S2) The information acquisition unit 31 acquires an environment sensor value from the environment sensor 7.

(Step S3) The intention estimation unit 33 estimates, for example, the content of work, an object desired to be gripped, and the like as the operator's motion intention on the basis of the obtained operator sensor value. The intention estimation unit 33 estimates the operator's intention using at least one of line-of-sight information, operator arm information, and head motion information. The intention estimation unit 33 may estimate the operator's motion intention using the environment sensor value as well. Subsequently, the gripping method determination unit 34 calculates a remote motion command to the robot 2 on the basis of the estimation result.

(Step S4) The control unit 21 calculates a driving command value for stable gripping on the basis of a remote motion command value calculated by the robot remote operation control device 3.

(Step S5) The control unit 21 controls the driving unit 22 in accordance with the driving command value to drive the gripping unit of the robot 2, and the like. After the processing, the control unit 21 causes the processing to return to the processing of step S1.

The processing procedure illustrated in FIG. 4 is an example, and the robot 2 and the robot remote operation control device 3 may process the above-described processing in parallel.

[Estimation Result, Work Information]

Next, examples of an estimation result and work information will be described using FIGS. 5 to 7.

Figure 5:
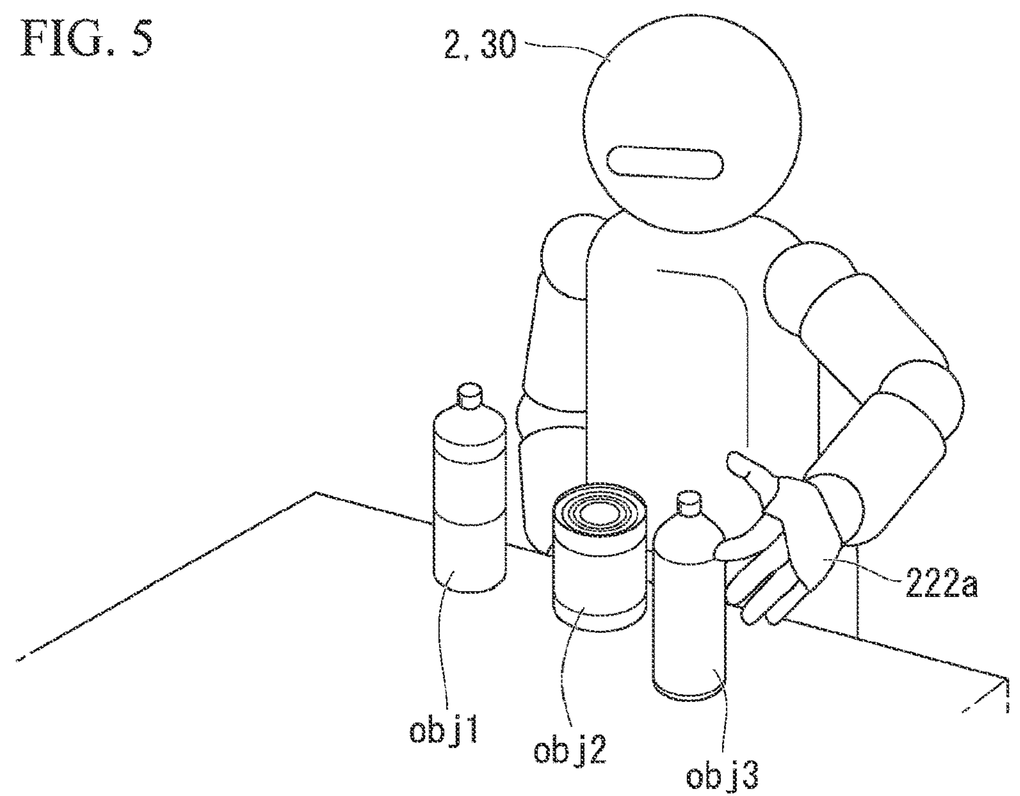
FIG. 5 is a diagram illustrating an example of a state in which three objects are placed on a table and an operator is causing the robot to grip an object obj3 with the operator's left hand.

FIG. 5 is a diagram illustrating an example of a state in which three objects obj1 to obj3 are placed on the table and the operator is causing the robot 2 to grip the object obj3 with his left hand.

In such a case, the robot remote operation control device 3 needs to estimate whether the object that the operator desires the robot 2 to grip is one of the objects obj1 to obj3. The robot remote operation control device 3 needs to estimate whether the operator is attempting to grip the object with the right hand or with the left hand.

Here, the reason why it is necessary to estimate the operator's motion intention in advance will be described.

In the case of remote control, the world that the operator views with the HMD 5 is different from the real world that the operator views with his or own eyes. Even when the operator gives an operation instruction via the controller 6, the operator is not actually gripping the object, and thus this is different from situation recognition in the real world. Furthermore, a delay occurs between the operator's instruction and the motion of the robot 2 due to a communication time, a computation time, and the like. Due to a difference in a physical structure (mainly the hand) between the operator and the robot, even when the operator himself or herself particularly commands the movement of a finger capable of gripping the object and the robot traces it accurately, it is not necessarily possible for the robot to actually grip the object. In order to solve this problem, in the present embodiment, the operator's motion intention is estimated, and the operator's motion is converted into a suitable motion for the robot.

In this manner, in remote control using a system of the related art, it is difficult to recognize a situation in the real world, and it is not possible to pick an object well. In the remote control using the system of the related art, for example, it is necessary for the operator to gradually bring a gripping portion 22*a* of the robot 2 closer to the object and perform accurate positioning to cause the robot to grip the object.

On the other hand, in the present embodiment, the operator's motion intention is estimated, and the motion of the robot 2 is controlled on the basis of an estimation result, thereby making it possible to realize picking-up of the object even when the operator does not perform accurate positioning.

Next, an example of processing such as intention estimation processing and correction will be described.

Figure 6:
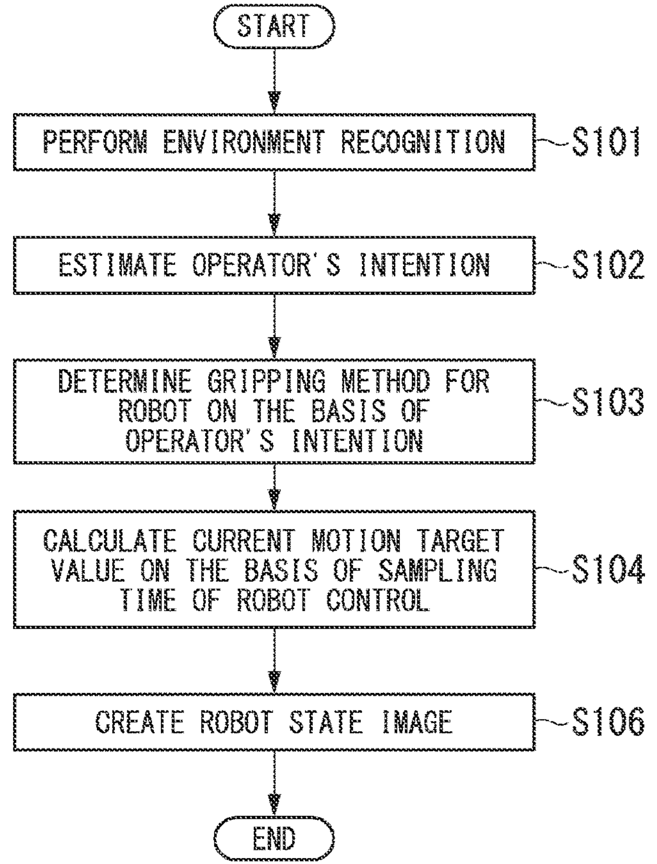
FIG. 6 is a flowchart of a processing example of the robot remote operation control device according to the embodiment.

FIG. 6 is a flowchart of a processing example of the robot remote operation control device 3 according to the present embodiment.

(Step S101) The intention estimation unit 33 performs environment recognition such as recognizing that three objects obj1 to obj3 are placed on the table by using the acquired environment sensor value.

When the operator remotely controls the robot 2 to grip the object obj3, the operator generally turns his or her line of sight toward the object to be gripped. For this reason, the intention estimation unit 33 estimates that a target object is the object obj3 on the basis of the line-of-sight information included in the operator state information acquired from the HMD 5. The intention estimation unit 33 may also perform estimation using information on the direction and inclination of the head included in the operator state information. When there are a plurality of objects, the intention estimation unit 33 calculates a probability that each object is a target object (reach object probability). The intention estimation unit 33 calculates the probability on the basis of, for example, line-of-sight information, a distance between the estimated target object and the gripping portion of the robot 2, the position and movement (trajectory) of the controller 6, and the like.

(Step S102) The intention estimation unit 33 classifies motions by comparing the position and movement of the arm (the position of the hand, the movement (trajectory) of the hand, the positions of the fingers, the movement (trajectory) of the fingers, the position of the arm, the movement (trajectory) of the arm) included in the acquired operator state information, and the position and movement of the head with templates stored in the storage unit 37 to estimate the operator's motion intention of causing the robot to grip the object obj3 with the robot's left hand and how to grip (gripping method). For example, the gripping method determination unit 34 determines the gripping method with reference to, for example, templates stored in the storage unit 37. The gripping method determination unit 34 may select a gripping method, for example, by inputting it to a learned model stored in the storage unit 37. The intention estimation unit 33 estimates the operator's motion intention using at least one of line-of-sight information, operator arm information, and head motion information. The intention estimation unit 33 may also estimate the intention using the environment sensor value.

(Step S103) The gripping method determination unit 34 determines a gripping method for the robot 2 on the basis of the operator's estimated motion intention.

(Step S104) The gripping method determination unit 34 calculates the amount of deviation between the positions of the hand and fingers of the operator and the position of the gripping portion of the robot. The storage unit 37 stores, for example, a delay time or the like, which is a previously measured time required from an instruction to the motion of the driving unit 22. The gripping method determination unit 34 calculates the amount of deviation using, for example, the delay time stored in the storage unit 37. Subsequently, the gripping method determination unit 34 corrects the amount of deviation between the positions of the hand and fingers of the operator and the position of the gripping portion of the robot. The gripping method determination unit 34 calculates the current motion target value based on a sampling time of robot control.

(Step S106) The robot state image creation unit 35 creates a robot state image to be displayed on the HMD 5 on the basis of the results of recognition and estimation obtained by the intention estimation unit 33 and the result of calculation obtained by the gripping method determination unit 34. The robot state image also includes information on processing to be performed by the robot remote operation control device 3, system state information, and the like.

Figure 7:
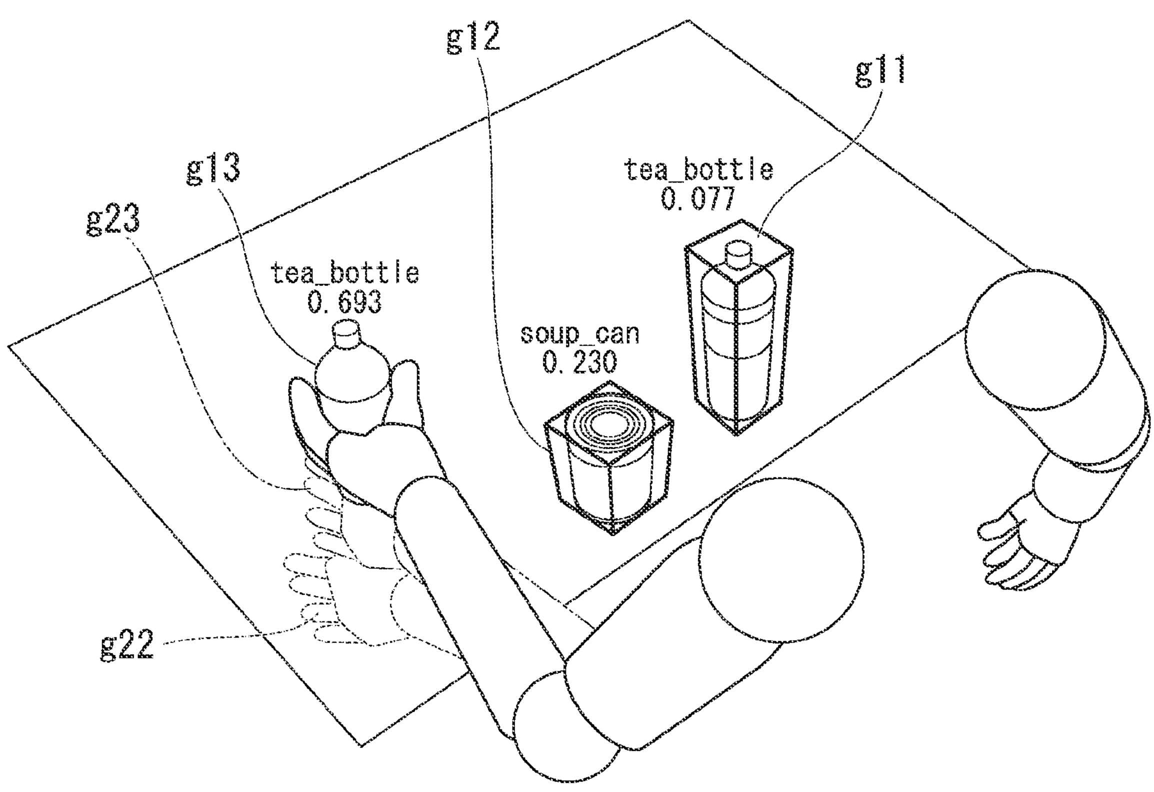
FIG. 7 is a diagram illustrating an example of a robot state image displayed on the HMD according to the embodiment.

FIG. 7 is a diagram illustrating an example of a robot state image displayed on the HMD 5 according to the present embodiment.

Images g11 to g13 correspond to the objects obj1 to obj3 placed on the table. It is assumed that a reach object probability in this case is 0.077 for the image g11, 0.230 for the image g12, and 0.693 for the image g13.

The image g21 represents the actual position of the gripping portion of the robot 2.

The image g22 represents the position input by the controller 6 of the operator.

The image g23 represents a corrected command position of the gripping portion of the robot 2.

In FIG. 7, the storage unit 37 stores shape data (for example, computer aided design (CAD) data) of the gripping portion of the robot 2, and the like. The robot state image creation unit 35 generates images of the gripping portion of the robot 2, and the like by using the shape data of the gripping portion of the robot 2, and the like. In addition, the robot state image creation unit 35 creates a robot state image such as illustrated in FIG. 7 by using, for example, a simultaneous localization and mapping (SLAM) method.

In this manner, the operator can visually observe the actual position of the gripping portion of the robot 2 (image g21), the position that is input by himself or herself (image g22), and the corrected position of the gripping portion of the robot 2 (image g23), and thus this is assistance to the operator. In the present embodiment, the motion of the robot is corrected on the basis of the operator's intention, and processing that the robot remote operation control device 3 attempts to perform is presented to the operator, for example, as visual information, thereby making it possible to smoothly perform remote operation. Thereby, according to the present embodiment, the position information of the gripping portion is corrected on the basis of the actual position of the gripping portion of the robot and the state of the operator, and thus it is possible to realize picking-up of a target object even when the operator does not perform accurate positioning.

In this manner, in the present embodiment, the following I to V are performed for remote control.

I. Recognition of an object

II. Intention estimation (for example, the estimation of an object to be gripped and taxonomy from the line of sight and a trajectory of the operator's hand tip)

III. Correction of a motion (for example, correction of the robot's hand tip trajectory to a position where the object can be gripped, selection of a gripping method)

IV. Stable gripping (control of the gripping portion for stable gripping with the selected gripping method)

V. A robot model, recognition results, information on the processing that the robot remote operation control device 3 attempts to perform, information on the state of the system, and the like are presented using the HMD.

Here, the motion correction will be further described.

The gripping method determination unit 34 obtains, for example, contact points of the fingers of the robot 2 to an object at which the robot can stably grip the object without dropping the object from classification of selected motions, the shape of the object, physical parameters such as estimated friction and weight of the object, and constraint conditions such as torques that can be output by the robot 2. Then, the gripping method determination unit 34 performs a correction operation using, for example, joint angles calculated from these as target values.

Next, stable gripping will be described.

When the robot operates in accordance with target values, the gripping method determination unit 34 controls joint angles of fingers, torques, and the like in real time, for example, so that errors between the target values/estimated parameter values and values observed from the sensor 27 of the robot 2 are eliminated. Thereby, according to the present embodiment, it is possible to stably and continuously grip the object without dropping it.

Thus, according to the present embodiment, it is possible to realize picking-up of a target object even when the operator does not perform accurate positioning. As a result, according to the present embodiment, even a user who is not skilled in operating the robot 2 can cause the robot to perform work with high accuracy.

In the above-described example, an example in which the robot 2 includes the robot remote operation control device 3 has been described, but the present invention is not limited thereto. The robot remote operation control device 3 may not be included in the robot 2 or may be an external device of the robot 2. In this case, the robot 2 and the robot remote operation control device 3 may transmit and receive various information. Alternatively, the robot 2 may have some of the functional units of the robot remote operation control device 3, and the other functional units may be included in the external device.

The above-described robot 2 may be, for example, a bipedal robot, a stationary reception robot, or a working robot.

In the above-described example, an example in which the robot 2 is caused to perform gripping by a remote operation has been described, but the present invention is not limited thereto. For example, when the robot 2 is a bipedal walking robot, the operator may remotely operate walking or the like of the robot 2 by wearing controllers on his or her legs. In this case, the robot 2 detects, for example, object information such as obstacles by image processing, and the operator may remotely operate the robot to avoid the obstacles and walk.

In the example described above, an example in which the operator wears the HMD 5 has been described, but the present invention is not limited thereto. Detection of line-of-sight information and provision of a robot state image to the operator may be performed by, for example, a combination of a sensor and an image display device.

A program for realizing all or some of the functions of the robot 2 and all or some of the functions of the robot remote operation control device 3 in the present invention is recorded on a computer-readable recording medium, and a computer system reads and executes the program recorded in the recording medium, whereby all or a portion of the processing performed by the robot 2 and all or a portion of the processing performed by the robot remote operation control device 3 may be performed. It is assumed that the "computer system" mentioned here includes hardware such as an OS and peripheral devices. It is assumed that the "computer system" includes a system built on a local network, a system built on a cloud, and the like. The "computer-readable recording medium" refers to a portable medium such as a flexible disc, a magneto-optical disc, a ROM, or a CD-ROM, and a storage device such as a hard disk incorporated in the computer system. It is assumed that the "computer-readable recording medium" stores a program for a fixed period of time, like a volatile memory (RAM) inside a computer system that serves as a server or a client when a program is transmitted via a network such as the Internet or a communication line such as a telephone line.

The above-described program may be transmitted from a computer system storing this program in a storage device or the like to another computer system via a transmission medium or by transmitted waves in a transmission medium. Here, the "transmission medium" for transmitting the program refers to a medium having a function of transmitting information, such as a network (communication network) such as the Internet or a communication circuit (communication line) such as a telephone line. The program may be used to realize some of the functions described above. It may be a so-called difference file (difference program) that can realize the above-described functions in combination with a program already recorded in the computer system.

Although the mode for carrying out the present invention has been described above using the embodiment, the present invention is not limited to such embodiment at all, and various modifications and replacements can be made without departing from the scope of the present invention.

Second Embodiment

Hereinafter, embodiments of the present invention will be described with reference to the drawings. In the drawings used in the following description, the scale of each member is appropriately changed so that each member has a recognizable size.

Outline

First, an outline of work and processing performed by a robot remote operation control system will be described.

Figure 8:
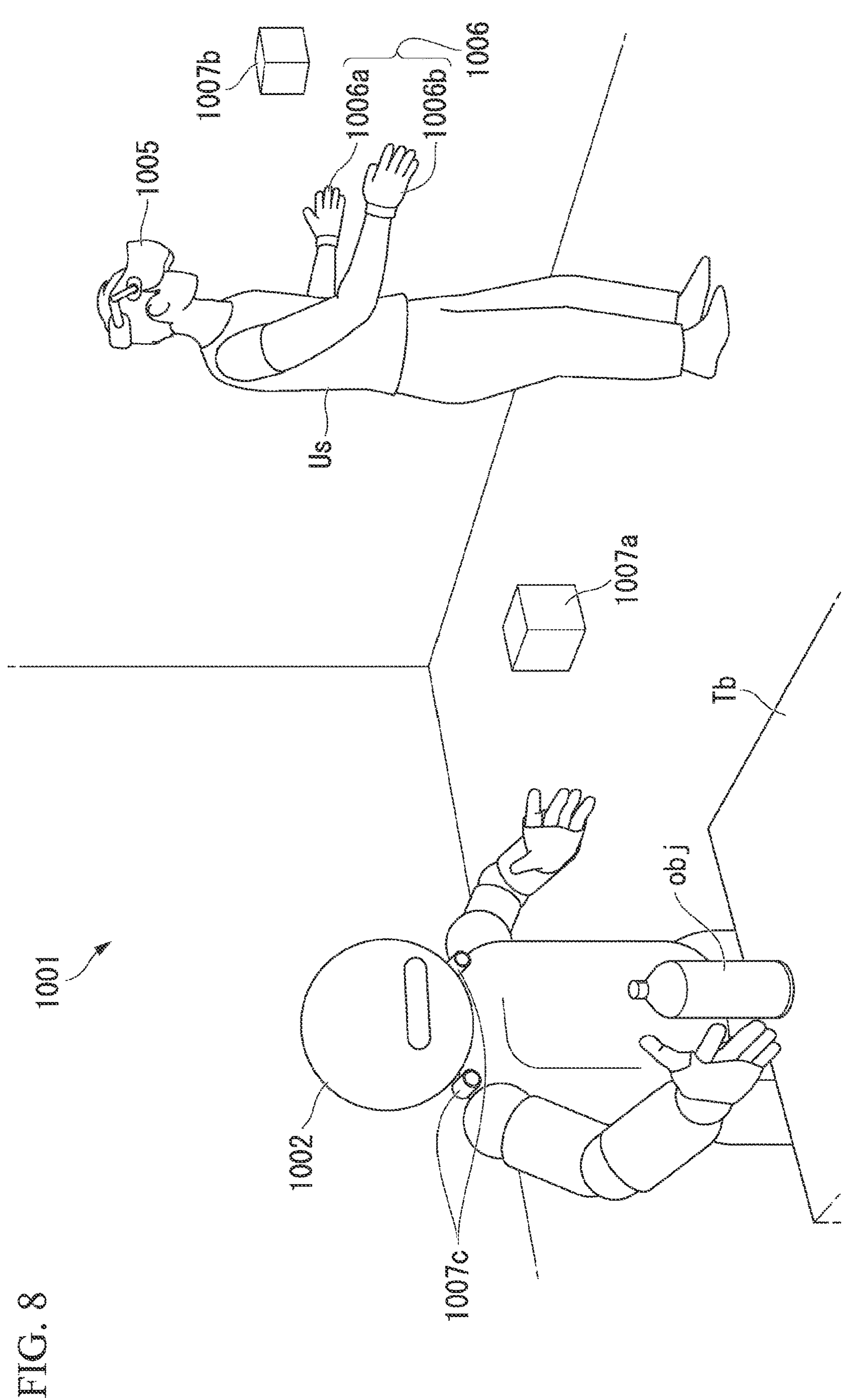
FIG. 8 is a diagram illustrating an outline of a robot remote operation control system and an outline of work according to an embodiment.

FIG. 8 is a diagram illustrating an outline of a robot remote operation control system 1001 and an outline of work according to the present embodiment. As illustrated in FIG. 8, an operator Us is wearing, for example, a head mounted display (HMD) 1005 and controllers 1006. Environment sensors 1007 (1007*a*, 1007*b*) are installed in a work environment. An environment sensor 1007*c* may be attached to a robot 1002. Each of the environment sensors 1007 (1007*a*, 1007*b*) includes, for example, an RGB camera and a depth sensor as described later. The operator Us remotely operates the robot 1002 by moving the hand or fingers wearing the controller 1006 while viewing an image displayed on the HMD 1005. In the example of FIG. 8, the operator Us remotely operates the robot 1002 to cause the robot to grip a plastic bottle obj on a table Tb and open a cap of the plastic bottle, for example. In the remote operation, the operator Us cannot directly view the motion of the robot 1002, but can indirectly view a video on the robot 1002 side through the HMD 1005. In the present embodiment, the operator's intention (information on a target object, the content of work) is estimated on the basis of information acquired by the controller 1006 worn by the operator and information acquired by the environment sensor 1007, and an operation is supported by limiting the degree of freedom to be controlled by the operator on the basis of the estimation result.

Configuration Example of Robot Remote Operation Control System

Next, a configuration example of the robot remote operation control system 1001 will be described.

Figure 9:
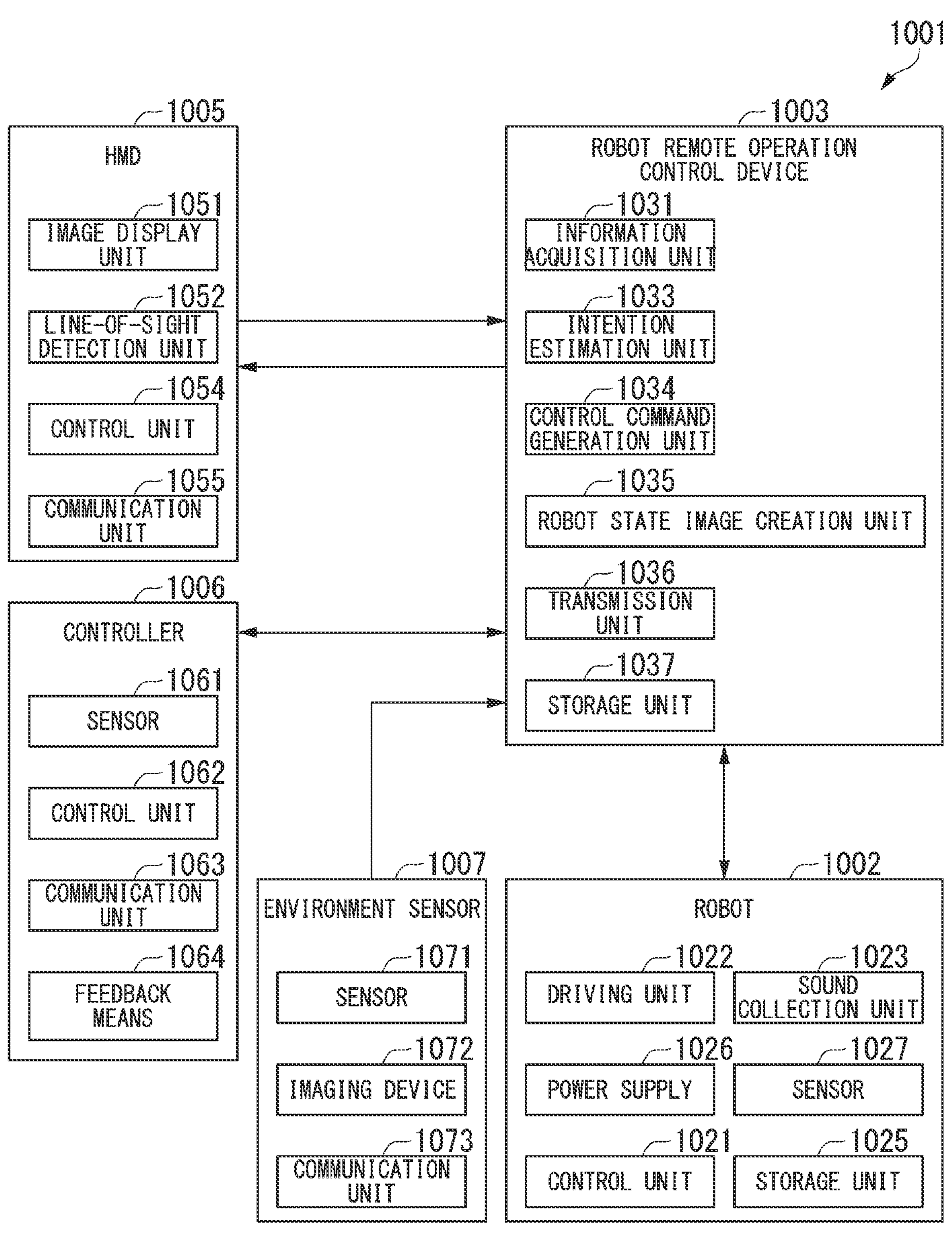
FIG. 9 is a block diagram illustrating a configuration example of the robot remote operation control system according to the embodiment.

FIG. 9 is a block diagram illustrating a configuration example of the robot remote operation control system 1001 according to the present embodiment. As illustrated in FIG. 9, the robot remote operation control system 1001 includes the robot 1002, a robot remote operation control device 1003, the HMD 1005, the controllers 1006, and the environment sensors 1007.

The robot 1002 includes, for example, a control unit 1021, a driving unit 1022, a sound collection unit 1023, a storage unit 1025, a power supply 1026, and a sensor 1027.

The robot remote operation control device 1003 includes, for example, an information acquisition unit 1031, an intention estimation unit 1033, a control command generation unit 1034, a robot state image creation unit 1035, a transmission unit 1036, and a storage unit 1037.

The HMD 1005 includes, for example, an image display unit 1051, a line-of-sight detection unit 1052 (operator sensor), a control unit 1054, and a communication unit 1055. The HMD 1005 may include a sensor that detects, for example, an inclination of the operator's head, and the like.

The controller 1006 includes, for example, a sensor 1061 (operator sensor), a control unit 1062, a communication unit 1063, and feedback means 1064.

The environment sensor 1007 includes, for example, an imaging device 1071, a sensor 1072, and a communication unit 1073.

The robot remote operation control device 1003 and the HMD 1005 are connected, for example, via a wireless or wired network. The robot remote operation control device 1003 and the controller 1006 are connected, for example, via a wireless or wired network. The robot remote operation control device 1003 and the environment sensor 1007 are connected, for example, via a wireless or wired network. The robot remote operation control device 1003 and the robot 1002 are connected, for example, via a wireless or wired network. The robot remote operation control device 1003 and the HMD 1005 may be directly connected without going through a network. The robot remote operation control device 1003 and the controller 1006 may be directly connected without going through a network. The robot remote operation control device 1003 and the environment sensor 1007 may be directly connected without going through a network. The robot remote operation control device 1003 and the robot 1002 may be directly connected without going through a network.

Functional Example of Robot Remote Operation Control System

Next, a functional example of the robot remote operation control system will be described with reference to FIG. 8.

The HMD 1005 displays a robot state image received from the robot remote operation control device 1003. The HMD 1005 detects the movement of the operator's line of sight and the like, and transmits the detected line-of-sight information (operator sensor value) to the robot remote operation control device 1003.

The image display unit 1051 displays the robot state image received from the robot remote operation control device 1003 under the control of the control unit 1054. The line-of-sight detection unit 1052 detects the line-of-sight of the operator and outputs the detected line-of-sight information to the control unit 1054.

The control unit 1054 transmits line-of-sight information based on the line-of-sight information detected by the line-of-sight detection unit 1052 to the robot remote operation control device 1003 via the communication unit 1055. The control unit 1054 causes the image display unit 1051 to display the robot state image transmitted by the robot remote operation control device 1003.

The communication unit 1055 receives the robot state image transmitted by the robot remote operation control device 1003 and outputs the received robot state image to the control unit 1054. The communication unit 1055 transmits operator state information to the robot remote operation control device 1003 under the control of the control unit 1054.

The controller 1006 is, for example, a tactile data glove worn on the operator's hand. The controller 1006 detects operator arm information, which is information on the posture and position of the operator's arm such as orientation, movement of each finger, and movement of the hand, using the sensor 1061, and transmits the detected operator arm information (operation sensor value) to the robot remote operation control device 1003. The operator arm information (operator sensor values) includes information on the entire human arm, such as hand tip position/posture information, angle information on each finger, elbow position/posture information, and movement tracking information on each part.

The sensor 1061 is, for example, an acceleration sensor, a gyroscope sensor, a magnetic force sensor, or the like. The sensor 1061, which includes a plurality of sensors, tracks the movement of each finger using, for example, two sensors. The sensor 1061 detects operator arm information and outputs the detected operator arm information to the control unit 1062.

The control unit 1062 transmits the operator arm information based on the detection result detected by the sensor 1061 to the robot remote operation control device 1003 via the communication unit 1063. The control unit 1062 controls the feedback means 1064 on the basis of the feedback information.

The communication unit 1063 transmits operator arm information to the robot remote operation control device 1003 under the control of the control unit 1062. The communication unit 1063 acquires feedback information transmitted by the robot remote operation control device 1003 and outputs the acquired feedback information to the control unit 1062.

The feedback means 1064 feeds back feedback information to the operator under the control of the control unit 1062. The feedback means 1064 feeds back sensations to the operator through, for example, means for applying vibration (not illustrated), means for applying air pressure (not illustrated), means for restricting hand movement (not illustrated), means for feeling temperature (not illustrated), means for feeling hardness or softness (not illustrated), and the like, which are attached to the gripping portion 1222 of the robot 1002, in accordance with the feedback information.

The environment sensor 1007 is installed, for example, at a position where the work of the robot 1002 can be imaged and detected. The environment sensor 1007 may be provided in the robot 1002 or may be attached to the robot 1002. Alternatively, a plurality of environment sensors 1007 may be installed in the work environment and attached to the robot 1002 as illustrated in FIG. 8. The environment sensor 1007 transmits the captured image and the detected detection result (environment sensor value) to the robot remote operation control device 1003.

The imaging device 1071 is, for example, an RGB camera. The imaging device 1071 transmits the captured image to the robot remote operation control device 1003 via the communication unit 1073. In the environment sensor 1007, a positional relationship between the imaging device 1071 and the sensor 1072 is known.

The sensor 1072 is, for example, a depth sensor. The sensor 1072 transmits the detected sensor value to the robot remote operation control device 1003 via the communication unit 1073. The imaging device 1071 and the sensor 1072 may be distance sensors.

The communication unit 1073 transmits captured images and sensor values detected by the sensor 1072 to the robot remote operation control device 1003 as environment sensor information. The environment sensor 1007 may detect position information of an object using the captured images and the sensor values, and transmit the detection result to the robot remote operation control device 1003 as the environment sensor information. Data transmitted by the environment sensor 1007 may be, for example, a point group having position information.

The action of the robot 1002 is controlled under the control of the control unit 1021 when the robot 1002 is not remotely operated. When the robot 1002 is remotely operated, the action of the robot 1002 is controlled in accordance with gripping plan information generated by the robot remote operation control device 1003.

The control unit 1021 controls the driving unit 1022 on the basis of a control command output by the robot remote operation control device 1003. The control unit 1021 acquires a three-dimensional position, size, shape, and the like of a target object in a captured image by a well-known method by using the image captured by the environment sensor 1007 and the detected detection result on the basis of information stored in the storage unit 1025. The control unit 1021 may perform sound recognition processing (utterance section detection, sound source separation, sound source localization, noise suppression, sound source identification, and the like) on acoustic signals collected by the sound collection unit 1023. When a result of sound recognition includes a motion instruction for the robot, the control unit 1021 may control the motion of the robot 1002 on the basis of the motion instruction using a sound. The control unit 1021 generates feedback information and transmits the generated feedback information to the controller 1006 via the robot remote operation control device 1003.

The driving unit 1022 drives each unit (arms, fingers, legs, head, torso, waist, and the like) of the robot 1002 under the control of the control unit 1021. The driving unit 1022 includes, for example, an actuator, a gear, an artificial muscle, and the like.

The sound collection unit 1023 is, for example, a microphone array including a plurality of microphones. The sound collection unit 1023 outputs the collected acoustic signals to the control unit 1021. The sound collection unit 1023 may have a sound recognition processing function. In this case, the sound collection unit 1023 outputs a sound recognition result to the control unit 1021.

The storage unit 1025 stores, for example, programs, threshold values, and the like used for control performed by the control unit 1021, and temporarily stores sound recognition results, image processing results, control commands, and the like. The storage unit 1037 may also serve as the storage unit 1025. Alternatively, the storage unit 1037 may also serve as the storage unit 1025.

The power supply 1026 supplies power to each part of the robot 1002. The power supply 1026 may include, for example, a rechargeable battery or a charging circuit.

The sensor 1027 is, for example, an acceleration sensor, a gyroscope sensor, a magnetic force sensor, each joint encoder, and the like. The sensor 1027 is attached to each joint, head, and the like of the robot 1002. The sensor 1027 outputs detected results to the control unit 1021, the intention estimation unit 1033, the control command generation unit 1034, and the robot state image creation unit 1035.

The robot remote operation control device 1003 estimates the operators' motion intention on the basis of the operator detection value detected by the operator sensor (the line-of-sight detection unit 1052 of the HMD 1005 and the sensor 1061 of the controller 1006) and the environment sensor value detected by the environment sensor 1007, and generate a control command for the robot 1002.

The information acquisition unit 1031 acquires line-of-sight information from the HMD 1005, acquires operator arm information from the controller 1006, and outputs the acquired line-of-sight information and operator arm information to the intention estimation unit 1033 and the robot state image creation unit 1035. The information acquisition unit 1031 acquires environment sensor information from the environment sensor 1007 and outputs the acquired environment sensor information to the intention estimation unit 1033 and the robot state image creation unit 1035. The information acquisition unit 1031 acquires a detection result detected by the sensor 1027 and outputs the acquired detection result to the intention estimation unit 1033 and the robot state image creation unit 1035.

The intention estimation unit 1033 estimates information on a target object (robot environment sensor values) (the name of the target object, the position of the target object, inclination of the target object in the vertical direction, and the like) on the basis of the environment sensor information acquired by the information acquisition unit 1031. The intention estimation unit 1033 performs image processing (edge detection, binarization processing, feature amount extraction, image emphasizing processing, image extraction, pattern matching processing, and the like) on the image captured by the imaging device 1071 of the environment sensor 1007 to estimate the name of the target object on the basis of, for example, the information stored in the storage unit 1037. The intention estimation unit 1033 estimates the position of the target object, an inclination angle in the vertical direction, and the like on the basis of the result of the image processing and the detection result of the depth sensor. The intention estimation unit 1033 estimates the target object, for example, also using the line-of-sight information of the operator detected by the HMD 1005. The intention estimation unit 1033 estimates the operator's motion intention on the basis of the line-of-sight information and the operator arm information acquired by the information acquisition unit 1031 and the information on the target object. The operator's intention and an estimation method will be described later.

The control command generation unit 1034 generates a control command for gripping an object on the basis of a result estimated by the intention estimation unit 1033, a detection result detected by the sensor 1027, and an image captured by the environment sensor 1007 and a detection result. The control command generation unit 1034 generates a control command by limiting the degree of freedom to be controlled by the operator and a controllable range, that is, by reducing the degree of freedom of the operator's motion, as will be described later. The control command generation unit 1034 outputs the determined control command information to the control unit 1021.

The robot state image creation unit 1035 creates a robot state image to be displayed on the HMD 1005 on the basis of the control command information generated by the control command generation unit 1034.

The transmission unit 1036 transmits the robot state image created by the robot state image creation unit 1035 to the HMD 1005. The transmission unit 1036 acquires feedback information output by the robot 1002 and transmits the acquired feedback information to the controller 1006.

The storage unit 1037 stores a positional relationship between the imaging device 1071 and the sensor 1072 of the environment sensor 1007. The storage unit 1037 stores a target to be assisted for each work content, that is, information that limits the degree of freedom to be controlled by the operator and a controllable range. The storage unit 1037 stores model images to be compared in pattern matching processing of image processing. The storage unit 1037 stores programs used for control of the robot remote operation control device 1003. The program may be on a cloud or a network.

Example of State where Operator is Wearing HMD 1005 and Controller 1006

Next, an example of a state in which the operator is wearing the HMD 1005 and the controller 1006 will be described.

Figure 10:
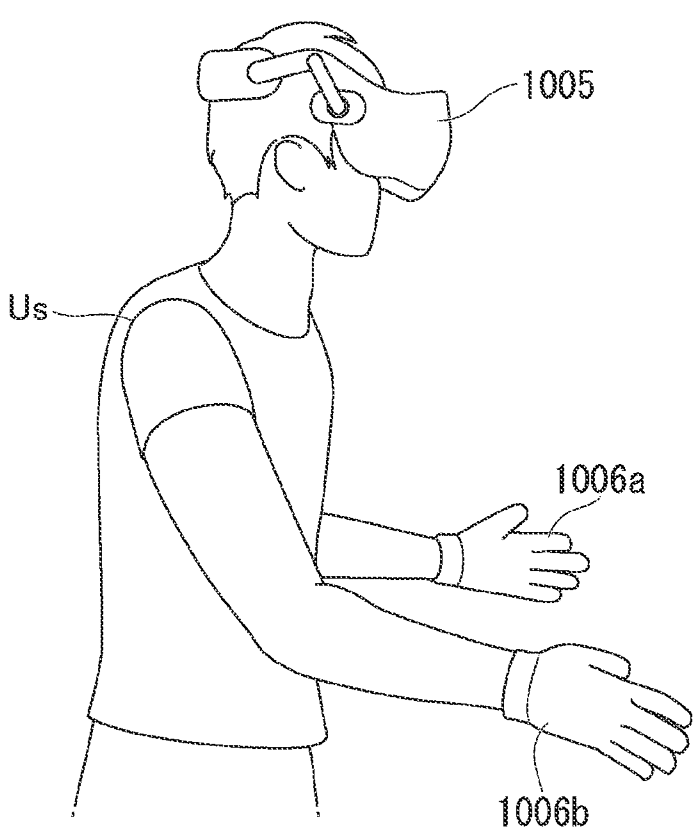
FIG. 10 is a diagram illustrating an example of a state in which an operator wears an HMD and a controller.

FIG. 10 is a diagram illustrating an example of a state in which the operator is wearing the HMD 1005 and the controller 1006. In the example of FIG. 10, the operator Us is wearing a controller 1006*a* on his or her left hand, a controller 1006*b* on his or her right hand, and the HMD 1005 on his or her head. The HMD 1005 and the controller 1006 illustrated in FIG. 10 are examples, and a wearing method, shape, and the like are not limited thereto.

Example of Intention Estimation and Control Command Generation

Next, an outline of intention estimation and control command generation processing will be described.

Figure 11:
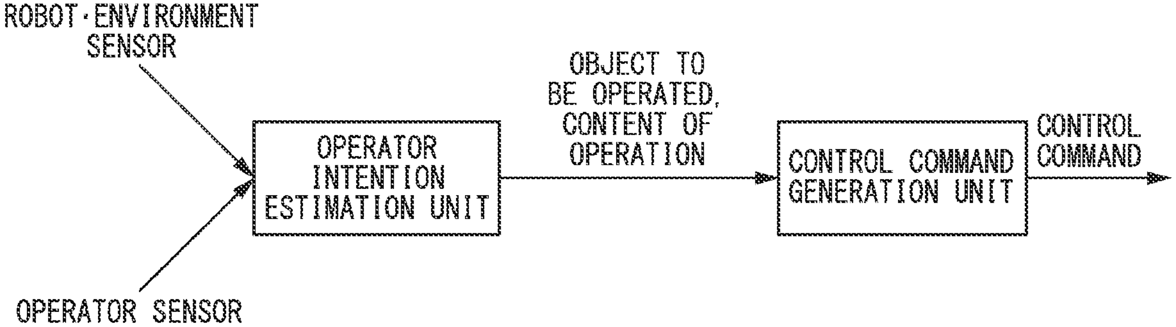
FIG. 11 is a diagram illustrating an outline of intention estimation and control command generation processing according to the embodiment.

FIG. 11 is a diagram illustrating an outline of intention estimation and control command generation processing according to the present embodiment.

As illustrated in FIG. 11, the robot remote operation control device 1003 acquires line-of-sight information from the HMD 1005, operator arm information from the controller 1006, environment sensor information from the environment sensor 1007, and detection results detected by the sensor 1027.

The information obtained from the robot 1002 is information such as detection values of motor encoders provided at respective joints of the robot 1002.

The information obtained from the environment sensor 1007 is images captured by the RGB camera, detection values detected by the depth sensor, and the like.

The intention estimation unit 1033 estimates the operator's motion intention on the basis of the acquired information and information stored in the storage unit 1037. The operator's intention is, for example, an object to be operated, the content of an operation, and the like. The content of the operation is, for example, opening a cap of a plastic bottle.

The control command generation unit 1034 limits the degree of freedom to be controlled by the operator and a controllable range in response to a target object and the content of work on the basis of the estimation result and information acquired by the intention estimation unit 1033. Then, the control command generation unit 1034 generates a control command on the basis of the result estimated by the intention estimation unit 1033.

Figure 12:
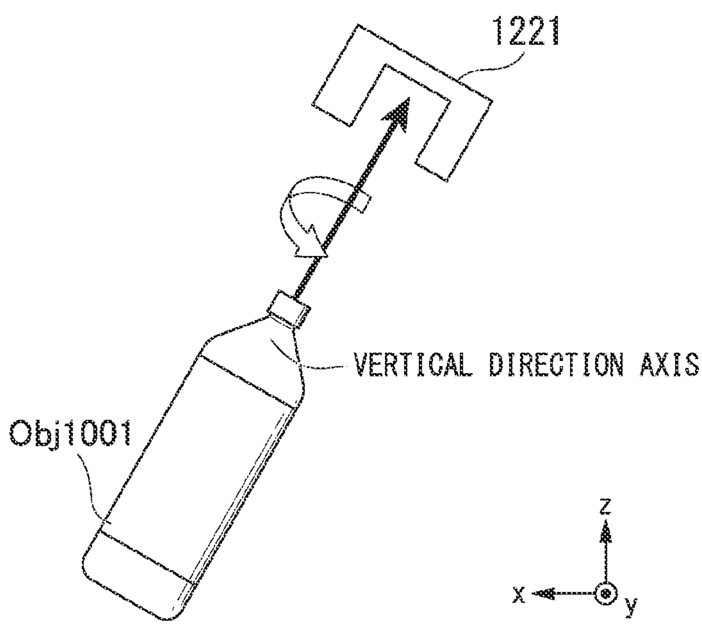
FIG. 12 is a diagram illustrating a case where the operator's intention is to open a cap of a plastic bottle.
Figure 13:
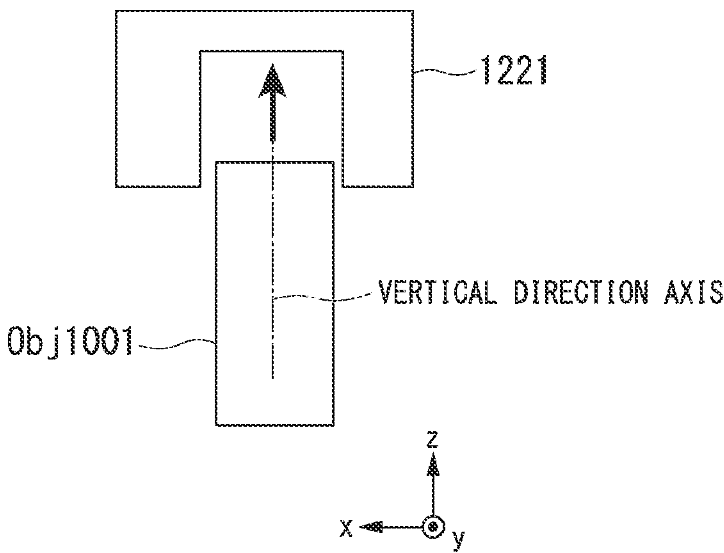
FIG. 13 is a diagram illustrating a case where the operator's intention is to grab a box.

Description of Examples of Limitations on Degree of Freedom to be Controlled by Operator and Controllable Range Next, examples of limitations on the degree of freedom to be controlled by the operator and a controllable range will be described with reference to FIGS. 12 and 13. The xyz axes in FIGS. 12 and 13 are the xyz axes in the robot world. The robot remote operation control device 1003 of the present embodiment performs the following limitations on the degree of freedom and correction of hand tip targets on the basis of xyz in the robot world.

Example of First Operation Content

FIG. 12 is a diagram illustrating a case where the operator's intention is to open a cap of a plastic bottle.

The intention estimation unit 1033 estimates a target object Obj 1001 on the basis of a tracking result of the operator's hand tip, line-of-sight information of the operator, an image captured by the environment sensor 1007, and a detection result. As a result, the intention estimation unit 1033 estimates that the operation target Obj 1001 is a "plastic bottle" on the basis of the acquired information. Further, the intention estimation unit 1033 detects, for example, the plastic bottle in the vertical direction and an inclination of the plastic bottle in the vertical direction, for example, the z-axis direction, on the basis of the image captured by the environment sensor 1007 and the detection result.

Next, the intention estimation unit 1033 estimates the content of operation on the basis of the tracking result of the operator's hand tip, the line-of-sight information of the operator, the image captured by the environment sensor 1007, and the detection result. As a result, the intention estimation unit 1033 estimates that the content of operation is a motion of "opening the cap of the plastic bottle" on the basis of the acquired information.

In the case illustrated in FIG. 12, in the method of the related art, the operator needs to remotely operate the gripping portion 1221 of the robot 1002 so as to open the cap of the plastic bottle while remotely operating the gripping portion 1221 so that it is in the vertical direction of the plastic bottle. In this manner, the method of the related art has a problem that the operator himself/herself is required to have a high level of operation technique.

On the other hand, in the present embodiment, the robot remote operation control device 1003 replaces control target value generation for some of six degrees of freedom depending on a situation, thereby limiting the degree of freedom to be controlled by the operator. In the example of FIG. 12, the robot remote operation control device 1003 controls and assists the gripping portion 1221 of the robot 1002 so that the gripping portion 1221 of the robot 1002 stays in the vertical direction. Thereby, the operator can concentrate on and perform instructing the rotation of the cap without caring about the inclination of the plastic bottle.

Example of Second Operation Content

FIG. 13 is a diagram illustrating a case where the operator's intention is to grip a box.

The intention estimation unit 1033 estimates that an operation target Obj1002 is a "box" on the basis of acquired information.

Next, the intention estimation unit 1033 estimates that the content of operation is "gripping a box" on the basis of acquired information.

In the case illustrated in FIG. 13, the robot remote operation control device 1003 controls the gripping portion 1221 to, for example, assist the position of the operation target Obj1002 on the xy plane and the rotation around the xyz axes. Thereby, the operator can concentrate on and perform instructing translational movement of the z-axis position.

The target objects, the content of work, the content of assistance (degree of freedom), and the like illustrated in FIGS. 12 and 13 are examples, and the target objects, the content of work, and the content of assistance are not limited thereto. The content of assistance may be anything corresponding to the target object or the content of work.

Here, an example of information stored in the storage unit 1037 used for assistance of work will be described.

FIG. 14 is a diagram illustrating an example of information stored in the storage unit 1037 according to the present embodiment. As illustrated in FIG. 14, the storage unit 1037 stores a target object, the content of work, the degree of freedom limited for the operator (the degree of freedom reinforced by the robot 1002), and the degree of freedom allowing the operator to perform an operation in association with each other. The example illustrated in FIG. 14 is an example, and other information may also be associated and stored.

Since a coordinate system differs between an operator operation environment and a robot motion environment, for example, the operator operation environment and the robot motion environment may be calibrated when the robot 1002 is activated.

During gripping, the robot remote operation control device 1003 may determine a gripping position in consideration of an error of the gripping position at the time of gripping on the basis of a gripping force of the robot 1002, a frictional force between the object and the gripping portion, and the like.

[Correction of Hand Tip Target of Gripping Position]

Next, an example of correction of a hand tip target of a gripping position with the assistance of the robot remote operation control device 1003 will be described.

FIG. 15 is a diagram illustrating an example of correction of a hand tip target of a gripping position with the assistance of the robot remote operation control device 1003. In the example of FIG. 15, the shape of a target object g1021 to be gripped is a substantially rectangular parallelepiped. When the robot remote operation control device 1003 gives assistance by limiting the degree of freedom to make it easy to grip the target object g1021 with respect to an input g1011 of the operator, the robot remote operation control device 1003 changes a hand tip target to a position where the target object g1021 is easily gripped (corrected position g1012). For example, when the vertical direction of the target object is inclined with respect to the z-axis direction as illustrated in FIG. 12, the change of the hand tip target corrects the angle of the operator's input in the z-axis direction so that the angle matches the vertical direction of the plastic bottle, thereby generating a control command for the gripping portion 1221. More specifically, first, the control command generation unit 1034 estimates a pattern for assistance for each object. The estimation method is performed, for example, by matching with a database stored in the storage unit 1037 or by machine learning. After the assistance pattern is estimated, the control command generation unit 1034 corrects the direction by performing vector computation (outer product/inner product) between a coordinate system of the object and a hand tip coordinate system of the robot. The control command generation unit 1034 may perform correction and command value generation by an end-to-end machine learning method for directly generating a correction command value from sensor information, for example, inclusive of direction correction through vector computation. Thereby, according to the present embodiment, the robot remote operation control device 1003 estimates a target object and the content of work and corrects a hand tip target to a position where the object is easily gripped, thereby making the operator easy to give an instruction.

The intention estimation unit 1033 or the storage unit 1037 may include an intention estimation model in which, for example, line-of-sight information, operator arm information, environment sensor information, and detection results detected by the sensor of the robot 1002 are input, and a target object and the content of operation are learned as teacher data. The intention estimation model may be provided on a cloud. The intention estimation unit 1033 may input acquired information to the intention estimation model to estimate the intention of the operator. Alternatively, the intention estimation unit 1033 may input acquired information to the intention estimation model to estimate at least one of a target object and the content of work.

Alternatively, the intention estimation unit 1033 may estimate the operator's intention by probabilistic inference by using acquired information. Alternatively, the intention estimation unit 1033 may estimate at least one of a target object and the content of work by probabilistic inference by using acquired information.

Example of Processing Procedure of Robot 1002 and Robot Remote Operation Control Device 1003

Next, an example of a processing procedure of the robot 1002 and the robot remote operation control device 1003 will be described.

Figure 16:
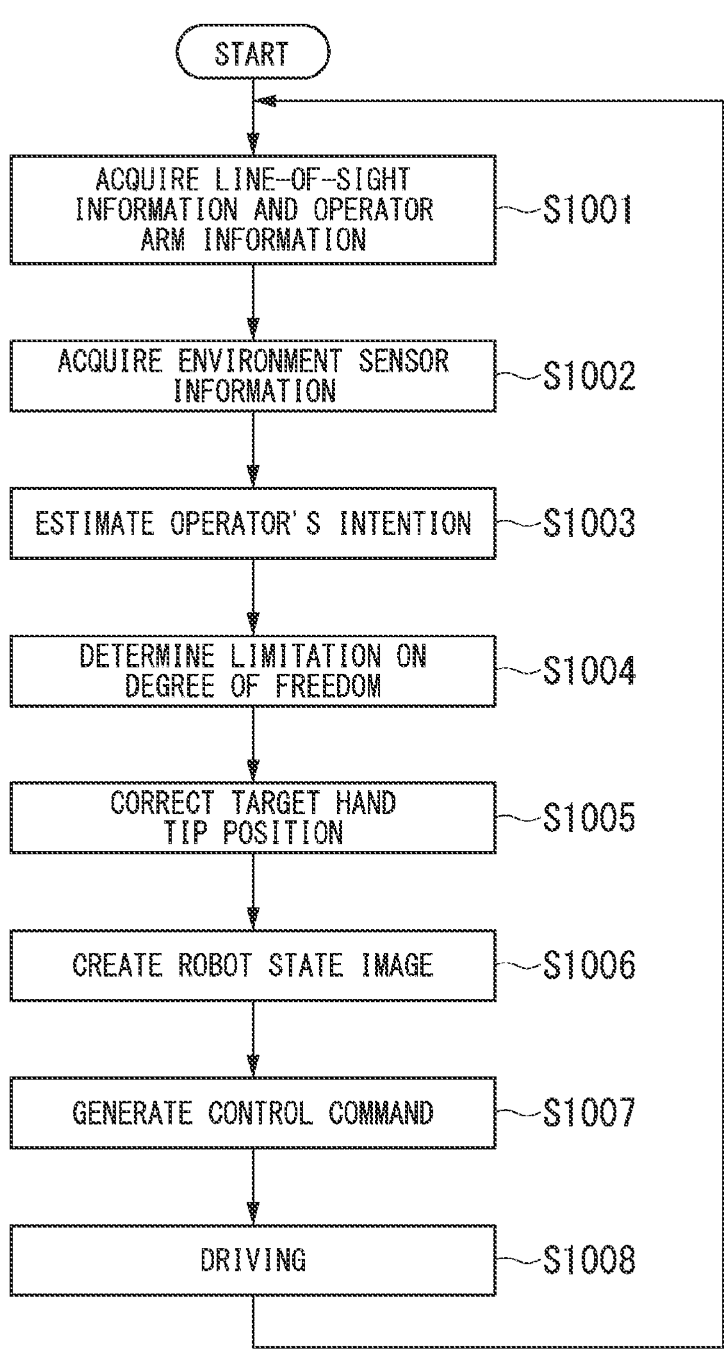
FIG. 16 is a flowchart of an example of a processing procedure of the robot and the robot remote operation control device according to the embodiment.

FIG. 16 is a flowchart of an example of a processing procedure of the robot 1002 and the robot remote operation control device 1003 according to the present embodiment.

(Step S1001) The information acquisition unit 1031 acquires line-of-sight information from the HMD 1005 and acquires operator arm information from the controller 1006.

(Step S1002) The information acquisition unit 1031 acquires environment sensor information from the environment sensor 1007.

(Step S1003) The intention estimation unit 1033 estimates the operator's intention including an object to be gripped and the content of work on the basis of the acquired line-of-sight information, operator arm information, and environment sensor information.

(Step S1004) The control command generation unit 1034 determines limitations on the degree of freedom of assistance of the robot remote operation control device 1003, that is, the degree of freedom of a motion instruction of the operator, on the basis of the estimated intention of the operator and the information stored in the storage unit 1037. The control command generation unit 1034 generates an appropriate control command for the degree of freedom of a portion of the operator's motion to reduce the degree of freedom of the operator's motion and generate a control command.

(Step S1005) The control command generation unit 1034 corrects a target hand tip position of gripping on the basis of arm movement information included in the acquired operator arm information and the degree of freedom to be limited which is determined in step S1004.

(Step S1006) The robot state image creation unit 1035 creates a robot state image to be displayed on the HMD 1005 on the basis of the operator arm information acquired by the information acquisition unit 1031, the result estimated by the intention estimation unit 1033, and the gripping position corrected by the control command generation unit 1034.

(Step S1007) The control command generation unit 1034 generates a control command on the basis of the corrected target hand tip position of gripping.

(Step S1008) The control unit 1021 controls the driving unit 1022 to drive the gripping portion and the like of the robot 1002 on the basis of the control command generated by the control command generation unit 1034. After the processing, the control unit 1021 causes the processing to return to the processing of step S1001. The processing procedure illustrated in FIG. 16 is an example, and the robot remote operation control device 1003 may process the above-described processing in parallel.

An image displayed on the image display unit 1051 of the HMD 1005 is, for example, an image as illustrated in FIG. 15. The robot state image may not include the image of the operator's input g1011. For example, the robot state image creation unit 1035 may present an assistance pattern with characters or displays a rectangle, an arrow, or the like on the HMD 1005 to limit the degree of freedom and present the content of assistance of the robot to the operator. Thereby, when the operator gives a work instruction while viewing the robot state image displayed on the HMD 1005, for example, when opening a cap of a plastic bottle, the operator can concentrate on a work instruction for opening the cap without caring about aligning the gripping portion with the vertical direction of the plastic bottle.

As described above, in the present embodiment, the robot remote operation control device 1003 determines the content of work and a target object through sensor information of installation in the robot 1002, the environment, and the operator, and generation of control target values of some of six degrees of freedom is substituted depending on a situation, thereby limiting the degree of freedom to be controlled by the operator. That is, in the present embodiment, the degree of freedom to be controlled by the operator is reduced by automatically generating an appropriate control command for some of the degrees of freedom.

Thereby, according to the present embodiment, it is possible to simultaneously achieve a reduction in the burden on the operator, diversification of work, and an improvement in efficiency in a remote-controlled robot.

The above-described example of limitation on the degree of freedom is an example and is not limited thereto. The limitation on the degree of freedom does not mean that the operator cannot completely control the degree of freedom, but also includes a limitation on an operable region.

For example, the robot remote operation control device 1003 does not limit the degree of freedom when a distance from a target object falls outside a predetermined range, but may limit the degree of freedom when the distance fall within the predetermined range from the target object. The predetermined range is, for example, a range of ±1001 m of the translational x-axis.

In the above-described example, an example in which a target object is gripped by remote control has been described, but the present invention is not limited thereto. The robot remote operation control device 1003 limits the degree of freedom in accordance with the content of work even when the content of work is different.

When there are a plurality of contents of work, the robot remote operation control device 1003 may change the limitation on the degree of freedom each time the content of works changes. For example, when a plurality of objects are placed on a table, and one plastic bottle is gripped from among them and then the cap of the plastic bottle is opened, robot remote operation control device 1003 sets a limitation on a first degree-of-freedom limitation in a gripping step and a second degree-of-freedom limitation when opening the cap.

In the case of the content of work performed using both gripping portions, the robot remote operation control device 1003 limits the degree of freedom and corrects a hand tip target for each gripping portion.

The above-described robot 1002 may be, for example, a bipedal robot, a stationary reception robot, or a working robot.

In the above-described example, an example in which the robot 1002 is caused to perform gripping by a remote operation has been described, but the present invention is not limited thereto.

In the above-described example, an example in which the operator wears the HMD 1005 has been described, but the present invention is not limited thereto. Detection of line-of-sight information and provision of a robot state image to the operator may be performed by, for example, a combination of a sensor and an image display device.

A program for realizing all or some of the functions of the robot 1002 and all or some of the functions of the robot remote operation control device 1003 in the present invention is recorded on a computer-readable recording medium, and a computer system reads and executes the program recorded in the recording medium, whereby all or a portion of the processing performed by the robot 1002 and all or a portion of the processing performed by the robot remote operation control device 1003 may be performed. It is assumed that the "computer system" mentioned here includes hardware such as an OS and peripheral devices. It is assumed that the "computer system" includes a system built on a local network, a system built on a cloud, and the like. The "computer-readable recording medium" refers to a portable medium such as a flexible disc, a magneto-optical disc, a ROM, or a CD-ROM, and a storage device such as a hard disk incorporated in the computer system. It is assumed that the "computer-readable recording medium" stores a program for a fixed period of time, like a volatile memory (RAM) inside a computer system that serves as a server or a client when a program is transmitted via a network such as the Internet or a communication line such as a telephone line.

The above-described program may be transmitted from a computer system storing this program in a storage device or the like to another computer system via a transmission medium or by transmitted waves in a transmission medium. Here, the "transmission medium" for transmitting the program refers to a medium having a function of transmitting information, such as a network (communication network) such as the Internet or a communication circuit (communication line) such as a telephone line. The program may be used to realize some of the functions described above. It may be a so-called difference file (difference program) that can realize the above-described functions in combination with a program already recorded in the computer system.

Although the mode for carrying out the present invention has been described above using the embodiment, the present invention is not limited to such embodiment at all, and various modifications and replacements can be made without departing from the scope of the present invention.

Third Embodiment

A third embodiment of the present invention will be described below with reference to the drawings.

Figure 17:
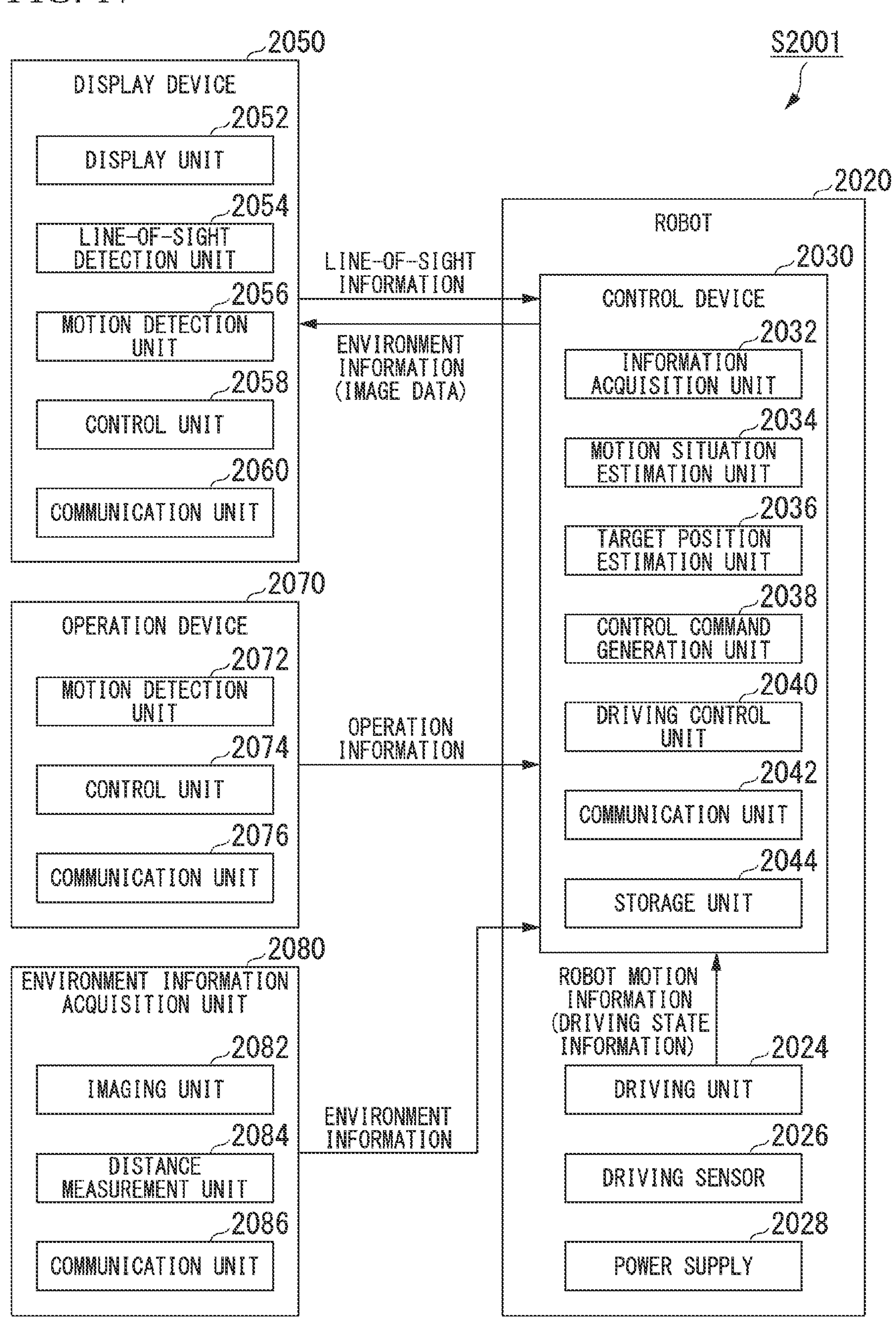
FIG. 17 is a schematic block diagram illustrating a configuration example of a robot system according to a third embodiment.

FIG. 17 is a schematic block diagram illustrating a configuration example of a robot system S2001 according to the present embodiment.

The robot system S2001 is a control system that can control the motion of a robot 2020 in accordance with the motion of an operator who is a user. The robot system S2001 is also a control system that controls the motion of the robot 2020 in accordance with an operation. The robot 2020 includes an effector (also referred to as an end-effector, an end effector, a robot hand, a hand tip effector, an effector, and the like). The effector is a member that mechanically acts and influences other objects. The effector has a plurality of finger parts and includes a mechanism that allows the robot to grip or release other objects. The individual finger parts are operable in response to movement of the operator's corresponding fingers. Thereby, various type of work are realized.

The robot system S2001 according to the present embodiment estimates a motion situation of the robot 2020 on the basis of environment information indicating a motion environment of the robot 2020 and operation information indicating a motion situation. As will be described later, the robot system S2001 may also use driving state information acquired from a driving sensor 2026, line-of-sight information of the operator, and the like when estimating the motion situation. The robot system S2001 generates a control command for moving the effector of the robot 2020 to a target position on the basis of characteristic parameters indicating control characteristics corresponding to the motion situation. The robot system S2001 controls the motion of the robot 2020 on the basis of the generated control command.

In the present application, the motion situation mainly includes the form of a motion performed by the robot 2020, that is, a task or a motion mode. The motion situation may include, for example, the type of work to be operated, a positional relationship with an object related to the work, the type or characteristics of the object, and the like as elements. The motion situation may be defined by including any one element or a combination of any elements. Even when operation information is common, a target position to which the effector of the robot 2020 is moved may vary depending on the motion situation.

The robot system S2001 includes the robot 2020, a display device 2050, an operation device 2070, and an environment information acquisition unit 2080. The robot 2020 includes one or more manipulators. The manipulator is also referred to as a robot arm. Each of the manipulators includes a plurality of segments, which are connected to each other. The plurality of segments include one effector. The effector is a member that is connected to one end of the manipulator and contacts an object to act on the object. The motion mechanism of the robot 2020 includes a joint for each segment pair including two segments among the plurality of segments, and an actuator for each joint. By changing an angle formed between two segments by the actuator, the position of the effector can be moved. In the following description, a case where the number of manipulators is one (single-arm type) is mainly described, but the number of manipulators may be two or more. The robot 2020 may be a stationary type that is fixed at a predetermined position, or a movable type in which its own position can be moved. In the following description, a case where the robot 2020 is a stationary type will be mainly described.

The control device 2030 of the robot 2020 is connected to the display device 2050, the operation device 2070, and the environment information acquisition unit 2080 in a wireless or wired manner so that various information can be input and output.

The display device 2050 and the operation device 2070 may be located in a space physically separated from the robot 2020 and the environment information acquisition unit 2080. In this case, the display device 2050 and the operation device 2070 may be configured as a remote operation system connected to the control device 2030 via a communication network.

The robot 2020 includes a driving unit 2024, a driving sensor 2026, a power supply 2028, and a control device 2030.

The driving unit 2024 includes an actuator for each joint and operates in response to a control command input from a driving control unit 2040 of the control device 2030. Each of the actuators is equivalent to a so-called motor, and changes an angle formed by two segments connected to the actuator in response to a target value of a driving amount indicated by a control command.

The driving sensor 2026 detects the driving state of the robot 2020 by the driving unit 2024 and outputs driving state information indicating the detected driving state to the control device 2030. The driving sensor 2026 includes, for example, a rotary encoder that detects an angle formed by two segments for each joint.

The power supply 2028 supplies power to each component provided in the robot 2020. The power supply 2028 includes, for example, a power supply terminal, a secondary battery, and a voltage converter. The power supply terminal enables connection of a power line, is supplied with power from the outside, and supplies the supplied power to the secondary battery or the voltage converter.

The secondary battery stores power supplied using the power supply terminal. The secondary battery can supply power to each component via the voltage converter. The voltage converter converts the voltage of the power supplied from the power supply terminal or the power supply terminal into a predetermined voltage required by each component, and supplies the power obtained by converting the voltage to each component.

Next, a functional configuration of the control device 2030 according to the present embodiment will be described with reference to FIGS. 17 and 18. FIG. 18 is a block diagram illustrating a functional configuration example of a portion of the control device 2030 according to the present embodiment. The control device 2030 includes an information acquisition unit 2032, a motion situation estimation unit 2034, a target position estimation unit 2036, a control command generation unit 2038, a driving control unit 2040, a communication unit 2042, and a storage unit 2044.

The information acquisition unit 2032 acquires various types of information regarding the situation of the operator and the situation of the robot 2020. For example, the information acquisition unit 2032 acquires line-of-sight information and first operator motion information from the display device 2050. The line-of-sight information and the first operator motion information constitute operator information indicating the operator's situation. The line-of-sight information is information indicating the line-of-sight direction of at least one eye of the operator at a certain time. The first operator motion information is information indicating the motion of the operator's head. The motion of the head is represented by the direction and position of the head for each time. In the present application, the line-of-sight information and the first operator motion information may be collectively referred to as operator information.

The information acquisition unit 2032 acquires second operator motion information from the operation device 2070. The second operator motion information is information indicating a body motion related to an operation performed by the operator. The second operator motion information constitutes operation information indicating the operation situation of the robot 2020. The second operator motion information includes information mainly indicating a motion of a hand as a body part of the operator. The hand motions include motions of at least two finger parts. The second operator motion information may include information indicating a motion of a wrist in addition to the motions of the hands. The motion of the wrist may be represented using a representative position of the wrist, and may further include information on its posture. The motion of the body part is represented using information on the position of the body part for each time. In the present application, the second operator motion information may be referred to as operation information.

The information acquisition unit 2032 acquires environment information from the environment information acquisition unit 2080. The environment information indicates the motion environment of the robot 2020. The environment information includes image data indicating an image indicating the motion environment of the robot 2020 and distance data indicating distances to objects distributed in the motion environment of the robot 2020.

The information acquisition unit 2032 acquires driving state information from the driving sensor 2026. The driving state information can also be regarded as posture information indicating the posture of the robot 2020. The time series of the driving state information at each time is equivalent to robot motion information indicating the motion of the robot 2020. The information acquisition unit 2032 stores acquired various information in the storage unit 2044.

The motion situation estimation unit 2034 reads the latest environment information and operation information at that point in time from the storage unit 2044, and estimates the motion situation of the robot 2020 on the basis of the read environment information and operation information. The motion situation estimation unit 2034 uses, for example, a predetermined machine learning model to estimate the motion situation of the robot 2020. When the environment information and the operation information are input as input information to the motion situation estimation unit 2034, a parameter set learned using training data is set in advance so that output information in which the reliability of the known motion situation corresponding to the input information is set to 1, and the reliability of the other motion situation candidates is set to 0 is obtained as output information. The training data is configured to include a large number of sets of input information and known output information. The parameter set is learned such that a difference between an estimated value of output information estimated from the input information and the known output information as the whole training data is minimized. In this case, the reliability for each motion situation obtained from the machine learning model can be determined as a real number value between 0 and 1. The motion situation estimation unit 2034 can specify, as the motion situation of the robot 2020, a motion situation candidate of which the reliability calculated for each motion situation candidate is higher than a predetermined reliability and is maximized. As a motion situation, for example, approach to an object (target object) located in the direction closest to the direction of the motion of the hand indicated by operation information at that point in time, among a plurality of objects located in the motion environment of the robot 2020, the form of an action (for example, gripping, releasing, friction, or the like) of an object in contact with the effector at that point in time, and the like are determined.

The motion situation estimation unit 2034 may read the latest operator information at that point in time from the storage unit 2044 and estimate the motion situation of the robot 2020 on the basis of the operator information in addition to the environment information and operation information. The operator information indicates a line-of-sight direction also taking the movement of the operator's head into consideration. For this reason, when a motion situation is estimated, a direction in which an event of interest to the operator occurs is further taken into consideration in accordance with the operator information. When the operator information is input as input information to the machine learning model in addition to the environment information and the operation information, the motion situation estimation unit 2034 sets a parameter set learned as described above in advance by using training data so that output information in which the reliability of the known motion situation corresponding to the input information is set to 1, and the reliability of the other motion situation candidates is set to 0 is obtained as an output.

The motion situation estimation unit 2034 may read the latest driving state information at that point in time from the storage unit 2044 and further estimate the motion situation of the robot 2020 on the basis of the driving state information. The driving state information indicates the posture of the robot 2020 and changes in the posture over time. For this reason, the posture of the robot 2020 is further taken into consideration when estimating the motion situation. When the driving state information is input to the machine learning model in addition to the environment information and the operation information as input information, the motion situation estimation unit 2034 sets a parameter set learned as described above in advance by using training data so that output information in which the reliability of the known motion situation corresponding to the input information is set to 1, and the reliability of the other motion situation candidates is set to 0 is obtained as an output.

The motion situation estimation unit 2034 determines characteristic parameters corresponding to the estimated motion situation. The characteristic parameters are parameters related to control characteristics for a motion of the effector. The characteristic parameters include, for example, a convergence determination parameter, any one weighting coefficient for each factor of an objective function, or a combination thereof. The storage unit 2044 stores a characteristic parameter table indicating characteristic parameters for each motion situation in advance. The motion situation estimation unit 2034 specifies characteristic parameters corresponding to the estimated motion situation with reference to the characteristic parameter table, and outputs the specified characteristic parameters to the control command generation unit 2038.

The convergence determination parameter is a parameter indicating a convergence determination condition for determining whether the position of the effector has converged to a target position. The strength of the convergence determination condition corresponds to the degree of constraint of the position to be converged (may be referred to as a "convergence position" in this application) with respect to the target position, in other words, is equivalent to accuracy with respect to the target position. As the convergence determination parameter, for example, a threshold value of a distance from the target position can be used. A smaller threshold value for the distance from the target position indicates a stronger convergence determination condition. The motion situation estimation unit 2034 may set a convergence determination parameter indicating a stronger convergence determination condition for a motion situation that requires higher followability of the position of the effector to be controlled. The followability means the property of being able to accurately control the position of the effector with respect to the target position, or the property requiring accurate control, that is, accuracy. Such motion situations include, for example, a situation in which a delicate object is installed in the effector and is sufficiently close to the target position, a situation in which a motion instructed by operation information is delicate, and the like.

Inverse kinematics calculation is an analysis method for determining the displacement of each joint from the target position, that is, one or both of an angle and an angular acceleration, and is also referred to as inverse kinematics analysis. Inverse dynamics calculation is an analysis method for determining a driving force of each joint for realizing the motion of each joint (that is, changes over time in one or both of an angle and an angular acceleration) in a link mechanism constituted by a plurality of connected segments, and is also referred to as inverse dynamics analysis. For this reason, inverse kinematics calculation is also closely related to inverse dynamics calculation. In the present embodiment, characteristic parameters related to the inverse kinematics calculation may include characteristic parameters related to inverse dynamics calculation.

On the other hand, the stronger the convergence determination condition, the higher the possibility that a solution for inverse kinematics calculation does not exist, or that even when there is a solution, the solution tends to be unstable. Consequently, the motion situation estimation unit 2034 may set a convergence determination parameter indicating a weaker convergence determination condition (for example, separation from the target position) in a motion situation that allows more flexibility of the position of the effector to be controlled. Flexibility means the property of allowing the position of the effector to deviate from the target position. Flexibility means the property of being reliably controllable, that is, safety. Motion situations that allow flexibility include, for example, a plurality of objects distributed in the vicinity of a path to the target position.

The objective function is used in the inverse kinematics calculation to numerically obtain an optimum solution for the motion of the robot 2020 by using a known method (optimization problem). In other words, the objective function is a function that quantitatively indicates the magnitude of a load for moving the effector to the target position, includes a plurality of types of factors, and is configured by synthesizing these factors. The weighting coefficient indicates the contribution of each factor to the objective function. The load means a cost related to control. The plurality of factors include the magnitude of a control error for each time as one factor. The magnitude of the control error is represented, for example, by the magnitude (distance) of an error between the final target position and convergence. Control is performed such that the greater the weighting coefficient for the control error, the higher the followability of the effector to the target position. The objective function may include, as a factor, any one or a combination of an arrival time from the current position of the effector to the convergence position, the magnitude of a jerk from the current position to the convergence position, the amount of electric power from the current position to the convergence position, momentum of the robot 2020 to the convergence position, and the magnitude of a difference between the present posture of the robot 2020 and the posture of the robot 2020 at a point in time when the effector is positioned at the convergence position. In the present application, optimization includes searching for a solution that makes the function value of the objective function smaller, and is not limited to absolutely minimizing the function value. Thus, the function value may temporarily increase.

For this reason, the motion situation estimation unit 2034 may set a larger weighting coefficient for the control error in a motion situation that requires higher followability of the position of the effector to be controlled. The motion situation estimation unit 2034 may set a smaller weighting coefficient for the control error in a motion situation in which more flexibility of the position of the effector to be controlled is allowed. The motion situation estimation unit 2034 may set a larger weighting coefficient for the magnitude of a jerk in a motion situation that requires higher continuity of the position of the effector to be controlled.

The motion situation estimation unit 2034 determines driving control parameters corresponding to the estimated motion situation. The driving control parameters are parameters related to control characteristics for driving each segment that constitutes the robot 2020. The driving control parameters are used when the controller constituting the driving control unit 2040 determines the operation amount for an actuator that drives each joint. The storage unit 2044 stores in advance a driving control parameter table indicating driving control parameters for each motion situation. The motion situation estimation unit 2034 specifies driving control parameters corresponding to the estimated motion situation with reference to the driving control parameter table, and outputs the specified driving control parameters to the driving control unit 2040.

For example, when the controller is a proportional-integral-differential (PID) controller, the driving control parameters include a proportional gain, an integral gain, and a differential gain. The proportional gain is a gain for calculating a proportional term, which is one component of the operation amount by multiplying a deviation between a target value and an output value at that point in time (current). The integral gain is a gain for calculating an integral term, which is another component of the operation amount, by multiplying an integral value of the deviation up to that point in time. The differential gain is a gain for calculating a differential term, which is still another component of the operation amount, by multiplying a differential value of the deviation at that point in time. The motion situation estimation unit 2034 may determine individual gains, for example, so that a differential gain becomes relatively larger than other types of gains in a motion situation that requires higher followability. The motion situation estimation unit 2034 determines individual gains, for example, so that an integral gain becomes relatively larger than other types of gains in a motion situation that requires higher flexibility.

The target position estimation unit 2036 reads the latest environment information and operation information at that point in time, and estimates the target position of the effector of the robot 2020 on the basis of the read environment information and operation information. The target position estimation unit 2036 outputs target position information indicating the estimated target position to the control command generation unit 2038.

The target position estimation unit 2036 uses, for example, a machine learning model to estimate a target position. In order to distinguish from the machine learning model in the motion situation estimation unit 2034, the machine learning model in the motion situation estimation unit 2034 and the machine learning model in the target position estimation unit 2036 may be referred to as a first machine learning model and a second machine learning model, respectively.

When the environment information and the operation information are input to the machine learning model as input information, parameter sets learned to be obtained as output information related to the target position corresponding to the input information are set in the target position estimation unit 2036 in advance.

As the target position, a position on the surface of the object that is empirically likely to be acted upon by the effector is set. The target position may depend on the shape of the object. For a vertically elongated cylinder whose height is greater than its diameter, a position closest to the effector among the cross-sections of the center of the bottom surface, the center of the surface, and an intermediate point in the height direction may be more likely to become a target position. The output information from the machine learning model may be information indicating the coordinates of the target position, but is not limited thereto. The output information may include information indicating, for example, an object for which a target position is set, the type, shape, and direction of the object, and the position of the object where the target position is installed. The target position estimation unit 2036 can determine the coordinates of the target position from the output information.

The target position estimation unit 2036 may read the latest operator information at that point in time from the storage unit 2044 and estimate a target position on the basis of the operator information in addition to the environment information and the operation information. For this reason, a target position is estimated in consideration of the direction in which an event of interest to the operator has occurred on the basis of the operator information. However, when the operator information is input as input information to the machine learning model in addition to the environment information and the operation information, parameter sets learned such that coordinate values of the target position corresponding to the input information are obtained as output information are set in the target position estimation unit 2036 in advance.

However, the target position estimation unit 2036 may not necessarily estimate a target position by using the second machine learning model. For example, when a motion situation notified by the motion situation estimation unit 2034 is a motion situation that is not accompanied by a continuous translational motion of the effector, the target position estimation unit 2036 does not estimate the target position using the second machine learning model. Such motion situation includes, for example, stop, rotation, gripping and releasing of an object, friction on the surface of the object, and the like. When the target position is not estimated using the second machine learning model, the target position estimation unit 2036 may adopt the position of the operator's hand indicated by the operation information as the target position.

The target position estimation unit 2036 can use mathematical models such as a neural network and a random forest as the first machine learning model and the second machine learning model.

The control command generation unit 2038 generates a motion command for moving the effector from the current position toward the target position indicated by the target position information input from the target position estimation unit 2036. The phase "toward the target position" or "directed to the target position" includes a meaning that the purpose is to move to the target position, but that reaching the target position is not guaranteed. The control command generation unit 2038 can read the driving state information stored in the storage unit 2044 and calculate the current position of the effector on the basis of the angles of the respective joints and the dimensions of the respective segments indicated by the driving state information. The control command generation unit 2038 can calculate the velocity of the effector on the basis of the angular velocity of each joint in addition to the angle of each joint and the dimensions of each segment indicated by the driving state information. The control command generation unit 2038 performs known inverse kinematics calculation on the basis of the characteristic parameters and driving state information (robot motion information) input from the motion situation estimation unit 2034, and determines an angle of each joint to move the effector to a convergence position. The control command generation unit 2038 outputs a motion command (joint command) indicating the determined angle of each joint (joint angle) to the driving control unit 2040.

When the characteristic parameters include a convergence determination parameter, the control command generation unit 2038 may determine any position within the region indicated by the convergence determination parameter from the target position as a convergence position in the inverse kinematics calculation and stop the movement of the effector 2038. When it is determined whether the current position of the effector has converged, the control command generation unit 2038 determines, for example, whether the current position of the effector is within a predetermined distance threshold value indicated by the characteristic parameters from the target position. When it is determined that the position of the effector has converged, the control command generation unit 2038 generates a control command indicating stopping of a motion and outputs the control command to the driving control unit 2040. The driving control unit 2040 stops updating and fixes the target values for the individual joints when the control command indicating the stopping of the motion is input from the control command generation unit 2038. At the convergence position, the control command generation unit 2038 may impose a constraint condition that the velocity of the effector is set to zero, or the driving control unit 2040 may impose a constraint condition that the angular velocity of each joint is set to zero.

When convergence characteristic parameters include a weighting coefficient for each factor of the objective function, the control command generation unit 2038 performs optimization calculation on the basis of the objective function synthesized using the weighting coefficients and the corresponding factors in the inverse kinematics calculation. The objective function is calculated, for example, as the sum (weighted sum) of factors of products of the factors and the weighting coefficients thereof. In the optimization calculation, the control command generation unit 2038 may recursively calculate the angle of each joint so that the objective function indicating a load occurring until the effector reaches the target position or the convergence position is minimized.

When target position information is not acquired from the target position estimation unit 2036, the control command generation unit 2038 may adopt the position of the hand indicated by the operation information as the target position. The control command generation unit 2038 performs inverse kinematics calculation to generate a motion command having the angle of each joint as a target value for moving the effector from the current position toward the adopted target position.

The driving control unit 2040 determines a driving command on the basis of the control command input from the control command generation unit 2038, the driving control parameters input from the motion situation estimation unit 2034, and the driving state information (robot motion information) read from the storage unit 2044. More specifically, the driving control unit 2040 is configured to include a controller that calculates an operation amount for performing control using an angle of each joint indicated by the control command as a target value, and determines a control command indicated by the calculated operation amount. The driving control unit 2040 outputs the determined control command to the driving unit 2024. The controller uses an angle indicated by the driving state information as an output value, and calculates an operation amount by applying the driving control parameters to a deviation between the target value and the output value in accordance with a control method set in the controller. The PID controller calculates the sum of multiplied values obtained by multiplying a deviation, a time integral value of the deviation, and a time differential value of the deviation by a proportional gain, an integral gain, and a differential gain, respectively, as an operation amount.

The communication unit 2042 transmits and receives various information between the components of the robot 2020 and other components (that is, the display device 2050, the operation device 2070, and the environment information acquisition unit 2080) in a wireless or wired manner. The communication unit 2042 includes, for example, an input/output interface, a communication interface, and the like.

The storage unit 2044 temporarily or permanently stores data used for various processing in the control device 2030, various data acquired by the control device 2030, and the like. The storage unit 2044 is configured to include a storage medium such as a random access memory (RAM) and a read only memory (ROM).

The display device 2050 includes a display unit 2052, a line-of-sight detection unit 2054, a motion detection unit 2056, a control unit 2058, and a communication unit 2060. The display device 2050 includes a support member that can be worn on the head of an operator who is a user, and may be configured as a head-mounted display (HMD).

The display unit 2052 receives image data using the communication unit 2060 from the environment information acquisition unit 2080 via the control device 2030. The display unit 2052 displays an image indicating the motion environment of the robot 2020 on the basis of the received image data. When the display unit 2052 is worn on the head of the operator, the display unit 2052 may be disposed at a position where the screen faces the front of both eyes.

The line-of-sight detection unit 2054 is configured to include a line-of-sight sensor that detects the line-of-sight direction of one or both eyes of the operator. The line-of-sight detection unit 2054 transmits line-of-sight information indicating the line-of-sight direction detected at each time to the control device 2030 using the communication unit 2060. The line-of-sight detection unit 2054 may be disposed at a position exposed to at least one eye when it is worn on the operator's head.

The motion detection unit 2056 detects the motion of the operator's head and transmits first operator motion information indicating the detected motion to the control device 2030 using the communication unit 2060. The motion detection unit 2056 is configured to include, for example, an acceleration sensor for detecting the motion of the operator.

The control unit 2058 controls the functions of the display device 2050. The control unit 2058 is configured to include a processor such as a central processing unit (CPU).

The communication unit 2060 transmits and receives various information to and from the control device 2030. The communication unit 2060 includes a communication interface.

The operation device 2070 includes a motion detection unit 2072, a control unit 2074, and a communication unit 2076. The operation device 2070 includes a support member that can be mounted on the hand of the operator who is a user, and may be configured as a data glove.

The motion detection unit 2072 detects the motion of the operator's hand, and transmits second operator motion information indicating the detected motion to the control device 2030 using the communication unit 2076. The motion detection unit 2072 is configured to include, for example, an acceleration sensor for detecting the motion of the operator's hand. A wrist tracker may also be connected to the operation device 2070. The wrist tracker is configured to include a support member that can be worn on the operator's wrist, and an acceleration sensor for detecting a wrist motion. The acceleration sensor that detects a wrist motion constitutes a portion of the motion detection unit 2072. The second operator motion information is transmitted to the control device 2030 inclusive of information indicating the motion of the wrist.

The control unit 2074 controls functions of the operation device 2070. The control unit 2074 is configured to include a processor such as a CPU.

The communication unit 2076 transmits and receives various information to and from the control device 2030. The communication unit 2076 is configured to include a communication interface.

The motion detection unit 2072 can be connected to the communication unit 2060 of the display device 2050. The second operator motion information may be transmitted to the control device via the communication unit 2060. In this case, the control unit 2074 and the communication unit 2076 may be omitted.

The environment information acquisition unit 2080 includes an imaging unit 2082, a distance measurement unit 2084, and a communication unit 2086. The environment information acquisition unit 2080 may be installed in the housing of the robot 2020 or may be installed at a position separate from the robot 2020.

The imaging unit 2082 captures images in the motion environment within a predetermined range from the robot 2020. The motion environment includes a range that the effector of robot 2020 may reach. The captured image does not necessarily include the entire image of the robot 2020. The imaging unit 2082 is a digital video camera that captures an image at predetermined time intervals. The imaging unit 2082 transmits image data indicating the captured image to the control device 2030 via the communication unit 2086.

The distance measurement unit 2084 measures a distance from the robot 2020 to the surface of an object in the motion environment within a predetermined range. The distance measurement unit 2084 includes, for example, a wave transmitting unit, a wave receiving unit, and a distance detection unit. The wave transmitting unit transmits waves such as infrared rays. The wave transmitting unit is configured to include, for example, a light emitting diode. The wave receiving unit receives reflected waves generated by reflection on the surface of the object. The wave receiving unit includes, for example, a photodiode. The reflected waves are generated in response to the incidence of the waves, which are transmitted from the wave transmitting unit, on the surface of the object as incident waves. The distance detection unit can detect a phase difference between the transmitted wave and the reflected wave, and determine a distance to the surface of the object on the basis of the detected phase difference. The distance detection unit transmits distance data indicating a distance determined for each direction corresponding to each pixel of an image to the control device 2030 via the communication unit 2086. Waves used for distance measurement are not limited to infrared rays, and may be millimeter waves, ultrasonic waves, or the like.

The communication unit 2086 transmits and receives various information to and from the control device 2030. The communication unit 2086 is configured to include a communication interface.

The communication unit 2086 may be omitted when the environment information acquisition unit 2080 is installed in the housing of the robot 2020 and can transmit and receive various information to and from other functional units of the robot 2020.

(Hardware Configuration)

Next, a hardware configuration example of the control device 2030 according to the present embodiment will be described.

Figure 19:
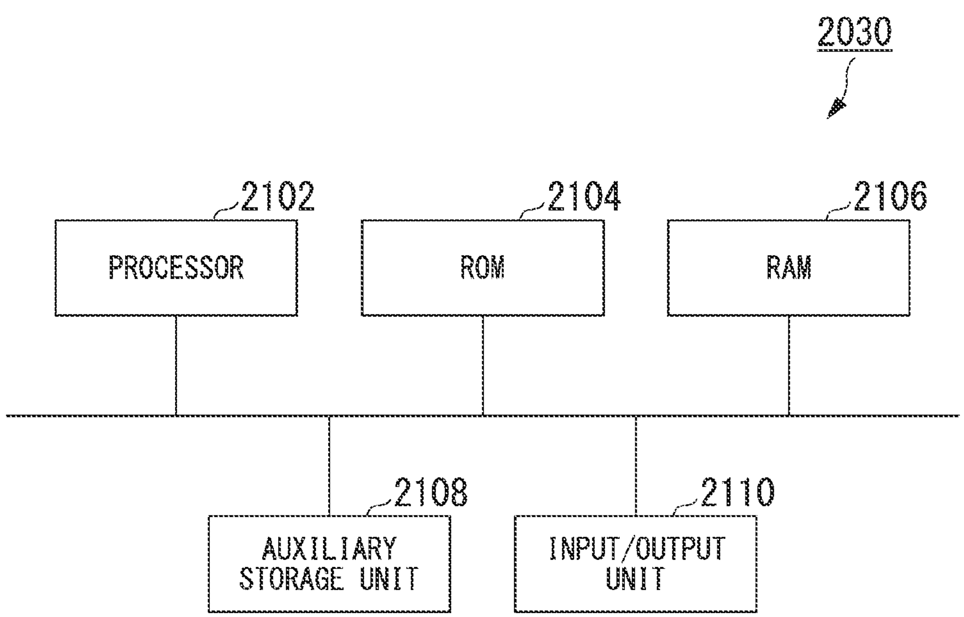
FIG. 19 is a schematic block diagram illustrating a hardware configuration example of the control device according to the third embodiment.

FIG. 19 is a schematic block diagram illustrating a hardware configuration example of the control device 2030 according to the present embodiment. The control device 2030 functions as a computer including a processor 2102, a ROM 2104, a RAM 2106, an auxiliary storage unit 2108, and an input/output unit 2110. The processor 2102, the ROM 2104, the RAM 2106, the auxiliary storage unit 2108, and the input/output unit 2110 are connected to be able to input and output various data to each other.

The processor 2102 reads, for example, programs and various data stored in the ROM 2104, executes the programs, and executes processing for realizing the functions of the respective units of the control device 2030 and processing for controlling the functions. The processor 2102 is, for example, a CPU.

In the present application, executing processing instructed by various instructions (commands) written in a program may be referred to as "execution of the program", "executing the program", or the like.

The ROM 2104 stores, for example, programs to be executed by the processor 2102.

The RAM 2106 functions as, for example, a work area that temporarily stores various data and programs used by the processor 2102.

The auxiliary storage unit 2108 permanently stores various data. The data acquired by the control device 2030 is stored in the auxiliary storage unit 2108. The auxiliary storage unit 2108 includes a storage medium such as a hard disk drive (HDD) or a solid state drive (SSD).

The input/output unit 2110 can input and output, for example, various data to and from other devices in a wireless or wired manner. The input/output unit 2110 may be connected to another device via a network. The input/output unit includes, for example, one or both of an input/output interface and a communication interface.

The display device 2050, the operation device 2070, and the environment information acquisition unit 2080 also include the same hardware configuration as the hardware configuration illustrated in FIG. 19, and may be configured as a computer that realizes functions as the respective devices.

(Motion Control Processing)

Next, an example of motion control processing according to the present embodiment will be described. FIG. 20 is a flowchart illustrating an example of motion control processing according to the present embodiment.

(Step S2102) The motion situation estimation unit 2034 acquires the latest environment information, operation information, and line-of-sight information at that point in time, and estimates the motion situation of the robot 2020 on the basis of these.

(Step S2104) The motion situation estimation unit 2034 determines characteristic parameters and driving control parameters corresponding to the estimated motion situation with reference to the characteristic parameter table and the driving control parameter table.

(Step S2106) The target position estimation unit 2036 acquires the latest environment information, operation information, and line-of-sight information at that point in time, and estimates the target position of the effector of the robot 2020 on the basis of these.

(Step S2108) The control command generation unit 2038 generates a control command for moving the effector from the current position toward the target position on the basis of the determined characteristic parameters.

(Step S2110) The driving control unit 2040 generates a driving command for controlling the angle of each joint to the target value indicated by the control command by using the driving control parameters.

(Step S2112) The control command generation unit 2038 determines whether the position of the effector has converged. The control command generation unit 2038 can determine whether convergence has occurred, for example, by determining whether the current position of the effector is within a predetermined distance threshold value indicated by the characteristic parameters from the target position. When it is determined that the position of the effector has converged (YES in step S2112), a control command indicating stopping of the motion is generated and output to the driving control unit 2040. Thereby, the motion of the robot 2020 is stopped. Thereafter, the processing of FIG. 20 is terminated. When it is determined that the position of the effector has not converged (NO in step S2112), the processing returns to step S2102.

Fourth Embodiment

Figure 21:
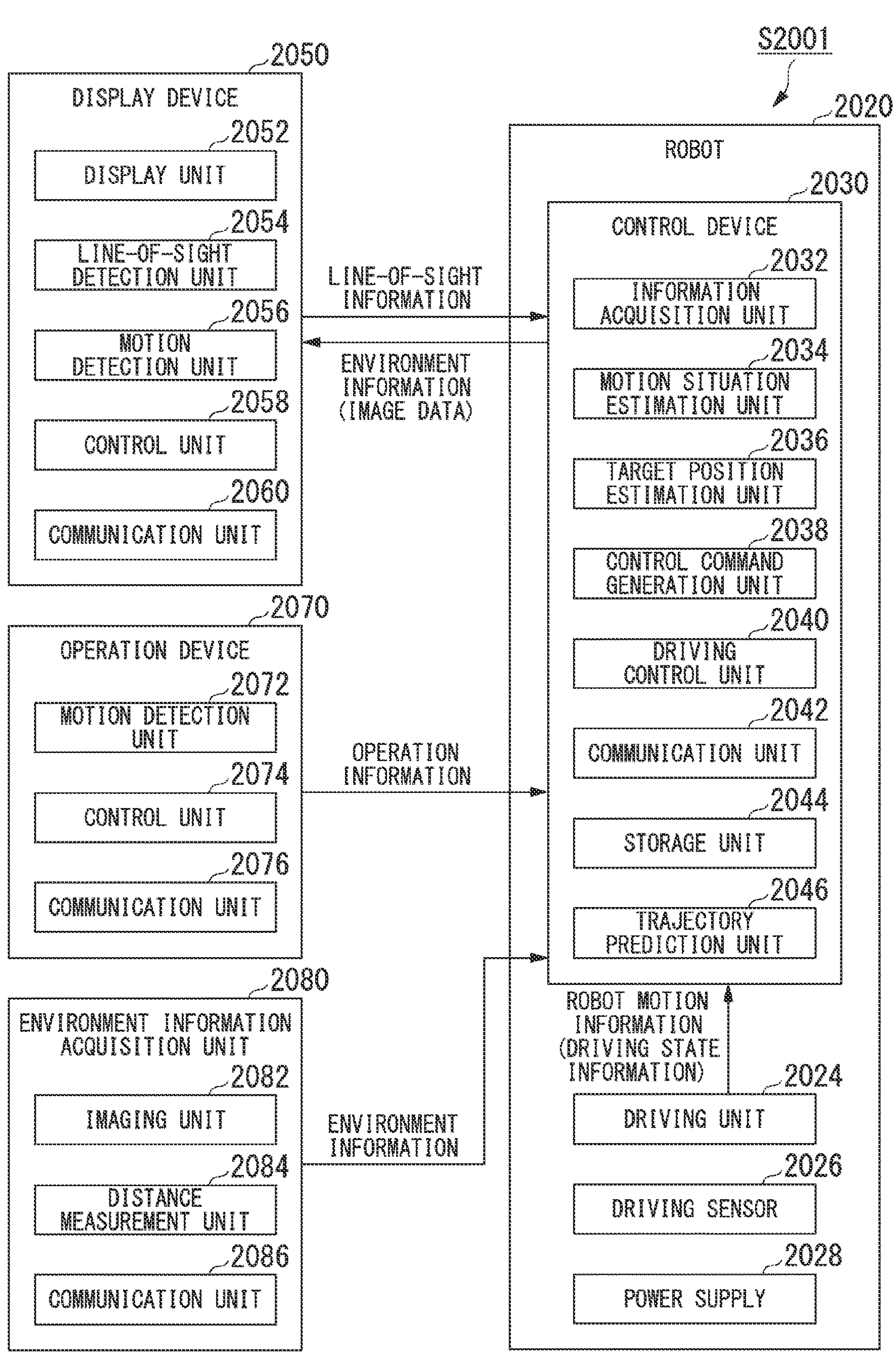
FIG. 21 is a schematic block diagram illustrating a configuration example of a robot system according to a fourth embodiment.
Figure 22:
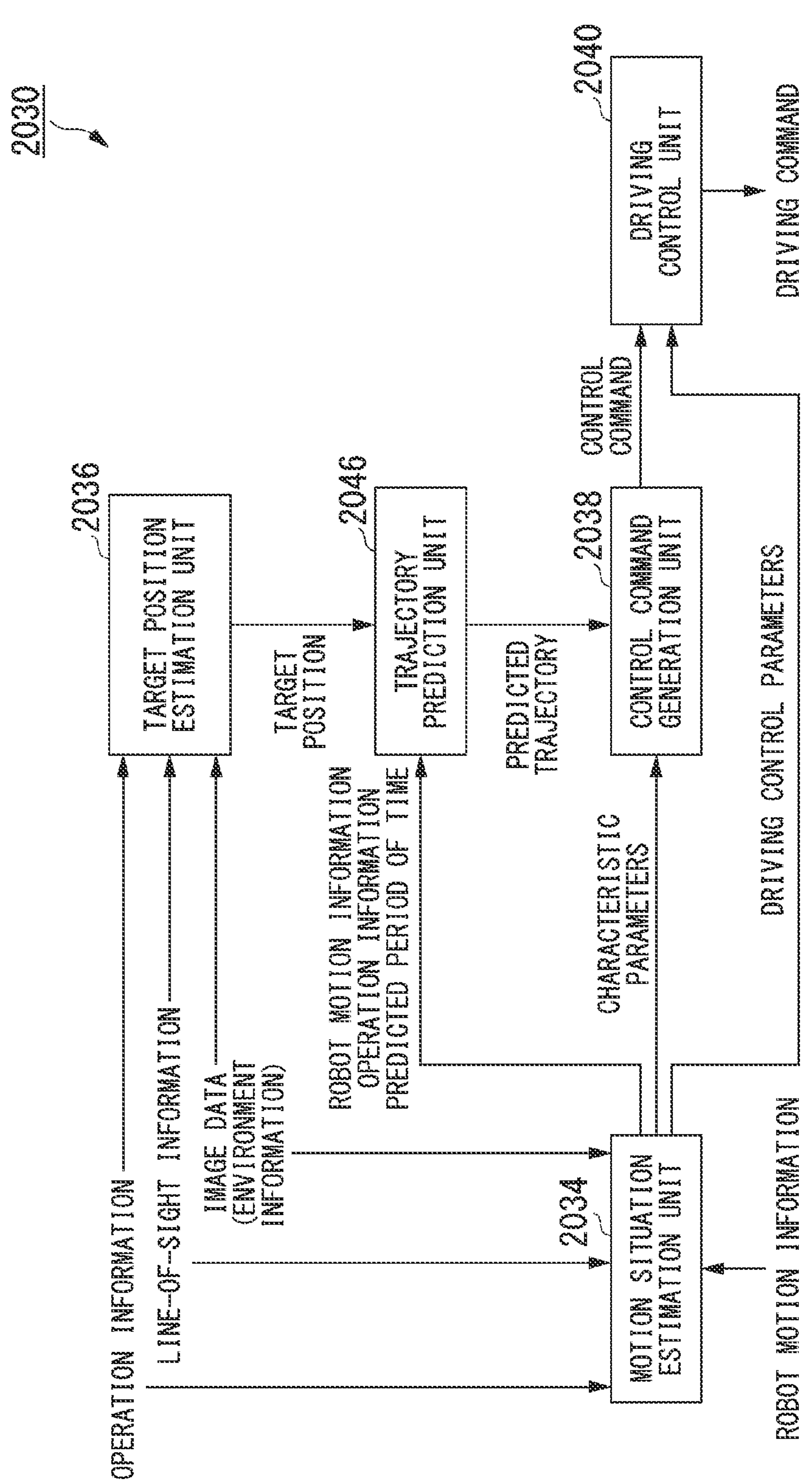
FIG. 22 is a block diagram illustrating a functional configuration example of a portion of a control device according to the fourth embodiment.

Next, a fourth embodiment of the present invention will be described. The following description mainly focuses on differences from the third embodiment, and unless otherwise specified, the description of the third embodiment is used for functions and configurations common to the third embodiment. A functional configuration of a robot system according to the present embodiment will be described with reference to FIG. 22 in addition to FIG. 21. FIG. 21 is a schematic block diagram illustrating a configuration example of a robot system S2001 according to the present embodiment. FIG. 22 is a block diagram illustrating a functional configuration example of a portion of a control device 2030 according to the present embodiment.

The robot system S2001 according to the present embodiment determines a predicted trajectory of an effector of a robot 2020 from the current time to the predicted time after a predetermined predicted period of time on the basis of position information indicating the position of the robot 2020 and operation information indicating an operation situation. The robot system S2001 generates a control command on the basis of the determined predicted trajectory. The robot system S2001 according to the present embodiment further includes a trajectory prediction unit 2046 in the control device 2030.

The trajectory prediction unit 2046 predicts a predicted trajectory indicating a motion of the effector of the robot 2020 from the current time to the predicted time, which is a predetermined predicted period of time later, by using robot motion information (driving state information) indicating at least the motion of the robot 2020 at that point in time and operation information. The operation information causes acceleration or deceleration for the effector, or in combination with a change of a direction. For example, the trajectory prediction unit 2046 performs linear prediction on the driving state information and the operation information within a predetermined period up to the current time, and calculates the position and velocity of the effector up to the predicted time. The trajectory prediction unit 2046 configures a time-series predicted trajectory of the position of the effector at each time up to the predicted time. The predicted period of time indicates an elapsed time from the current time to the predicted time, and is not a period of time spent for prediction.

The trajectory prediction unit 2046 may sequentially predict the position of the effector using, for example, a Kalman filter. The Kalman filter is a method that includes (a) prediction step and (b) updating step, which are repeated sequentially. In the (a) prediction step, the trajectory prediction unit 2046 adds the time evolution (weighted sum) of the state quantity of the effector up to the previous time and an external force to calculate an estimated value of the current state quantity of the effector. However, the state quantity is a vector having a position and a velocity as elements. The external force is a vector having a velocity and an acceleration as elements. The velocity is calculated on the basis of the angle and an angular velocity of each joint shown in the driving state information, and the dimensions of segments. The acceleration is calculated on the basis of an angle, an angular velocity, and an angular acceleration of each joint shown in the driving state information, and the dimensions of segments. The trajectory prediction unit 2046 adds a time evolution of a predicted error of a state quantity up to the previous time and a time evolution of an error to calculate the current predicted error. In the (b) updating step, the trajectory prediction unit 2046 calculates a difference between the current position (observed value) of the effector and the estimated value of the current position of the effector as an observation residual. The trajectory prediction unit 2046 calculates a covariance of the current observed error from the current predicted error. The trajectory prediction unit 2046 calculates a Kalman gain from the covariance of the current predicted error and the observation residual. The trajectory prediction unit 2046 updates the current state quantity of the effector to a value obtained by adding the estimated value of the current state quantity of the effector and a product of the observation residual and the Kalman gain. The trajectory prediction unit 2046 updates the current predicted error to a value obtained by multiplying the predicted error from the residual of mapping from 1 to an observation space multiplied by the Kalman gain.

The predicted period of time may be fixed at a predetermined value (for example, 0.2 s to 2 s) or may be variable. As the predicted period of time, a value that is equal to or less than a delay time (also referred to as a "following delay") until the operator's motion appears as the motion of the robot 2020 is set. The longer the predicted period of time, the larger the predicted error of the position of the effector, which may impair the operability.

When the predicted period of time is set to be variable, a storage unit 2044 may store in advance a predicted time table indicating a predicted period of time for each motion situation. In particular, when the predicted period of time exceeds a delay time, the motion of the robot 2020 precedes the motion of the operator, and thus there is a concern that a predicted error will become significant. For this reason, the delay time may be set as an upper limit of the predicted period of time. The motion situation estimation unit 2034 can estimate the motion situation of the robot 2020 by using the above-described method and specify a predicted period of time corresponding to the estimated motion situation with reference to the predicted time table.

The motion situation estimation unit 2034 may set a shorter predicted period of time for a motion situation that requires more accurate positioning of the effector to be controlled. Such a motion situation is a motion situation in which a predicted error of the effector is not allowed, but a delay is allowed. For example, this applies to a case where an object to be operated is a minute object, a case where the operator's operation is delicate, or the like. The motion situation estimation unit 2034 may set a longer predicted period of time for motion situation that requires more responsiveness of the position of the effector. As such a motion situation, it is suitable for a motion situation in which the responsiveness of the effector with respect to the operation is expected in exchange for the predicted error being allowed. For example, this applies to a case where the effector is operated toward a target object on a broader basis, a case where the effector is retreated to a space where other objects are not located, or the like.

The motion situation estimation unit 2034 outputs predicted time information indicating a specified predicted period of time to the trajectory prediction unit 2046. The trajectory prediction unit 2046 calculates the position and velocity of the effector up to the predicted time determined using the predicted period of time shown in the predicted time information input from the motion situation estimation unit 2034. The trajectory prediction unit 2046 outputs, to a control command generation unit 2038, predicted trajectory information indicating a predicted trajectory indicating the position and velocity of the effector at least from the current time to the predicted time.

When the control command generation unit 2038 generates a motion command for moving the effector from the current position toward a target position, the control command generation unit 2038 performs known inverse kinematics calculation on the basis of the predicted trajectory input from the trajectory prediction unit 2046 and the characteristic parameters input from the motion situation estimation unit 2034 instead of the driving state information, and determines an angle of each joint to move the effector to a convergence position. On the other hand, the driving state information up to the present time can also be regarded as an actual trajectory indicating the position of the effector at each time up to the present time. In the present embodiment, a predicted trajectory can be used instead of the actual trajectory to compensate for a delay in the motion of the effector.

Further, a controller provided in a driving control unit 2040 according to the present embodiment may calculate an operation amount by synthesizing a first component calculated in a feedback term and a second component calculated in a feedforward term. The feedback term is a term for calculating the first component, which is a partial component of the operation amount, on the basis of a deviation between a target value and an output value. An angle of each joint corresponding to a target position is used as the target value. An angle of each joint shown in the driving state information is used as the output value. This output value corresponds to the current position of the effector at that point in time. The above-described PI control and PID control correspond to a method of determining the first component as the operation amount without including the second component. That is, the above-described proportional term, integral term, and differential term are included in the first component. The feedforward term is a term for calculating the second component, which is another component of the operation amount, on the basis of a target value without considering an output value. The second component includes a second proportional term proportional to the target value. The second proportional term is obtained by multiplying the target value by a second proportional gain.

Consequently, in a driving control parameter table, as driving control parameters corresponding to individual motion situations, a second gain related to the second component is set in addition to a first gain related to the first component (any of the above-described proportional gain, integral gain, and differential gain, or a combination thereof). The second gain includes a second proportional gain. The second component may further include one or both of a second integral term proportional to a time integral value of the target value and a second differential term proportional to the time differential value of the target value. The second integral term is obtained by multiplying the target value by a second integral gain. The second differential term is obtained by multiplying the target value by a second differential gain. The second gain further includes one or both of the second integral gain and the second differential gain. Then, a ratio between the first gain and the second gain may vary depending on a motion situation. For example, the first gain and the second gain may be determined such that a ratio of a first factor to a second factor becomes relatively large in a motion situation that requires higher accuracy of the position of the effector to be controlled. In such a motion situation, a feedback term is relatively emphasized. The first gain and the second gain may be determined such that a ratio of the second factor to the first factor becomes relatively large in a motion situation that requires higher responsiveness of the position of the effector. In such a motion situation, the feedforward term is relatively emphasized.

The motion situation estimation unit 2034 specifies driving control parameters including the first gain and the second gain corresponding to the estimated motion situation with reference to the driving control parameter table, and outputs the specified driving control parameters to the driving control unit 2040. The driving control unit 2040 calculates a first factor and a second factor for each joint on the basis of the first gain and the second gain shown in the driving control parameters input from the motion situation estimation unit 2034, and determines an operation amount by synthesizing the calculated first factor and the calculated second factor. The driving control unit 2040 outputs a driving command indicating the operation amount determined for each joint to the driving unit 2024.

The controller according to the present embodiment may determine the second component as the operation amount without including the first component. In this case, setting of the first gain may be omitted.

(Motion Control Processing)

Figure 23:
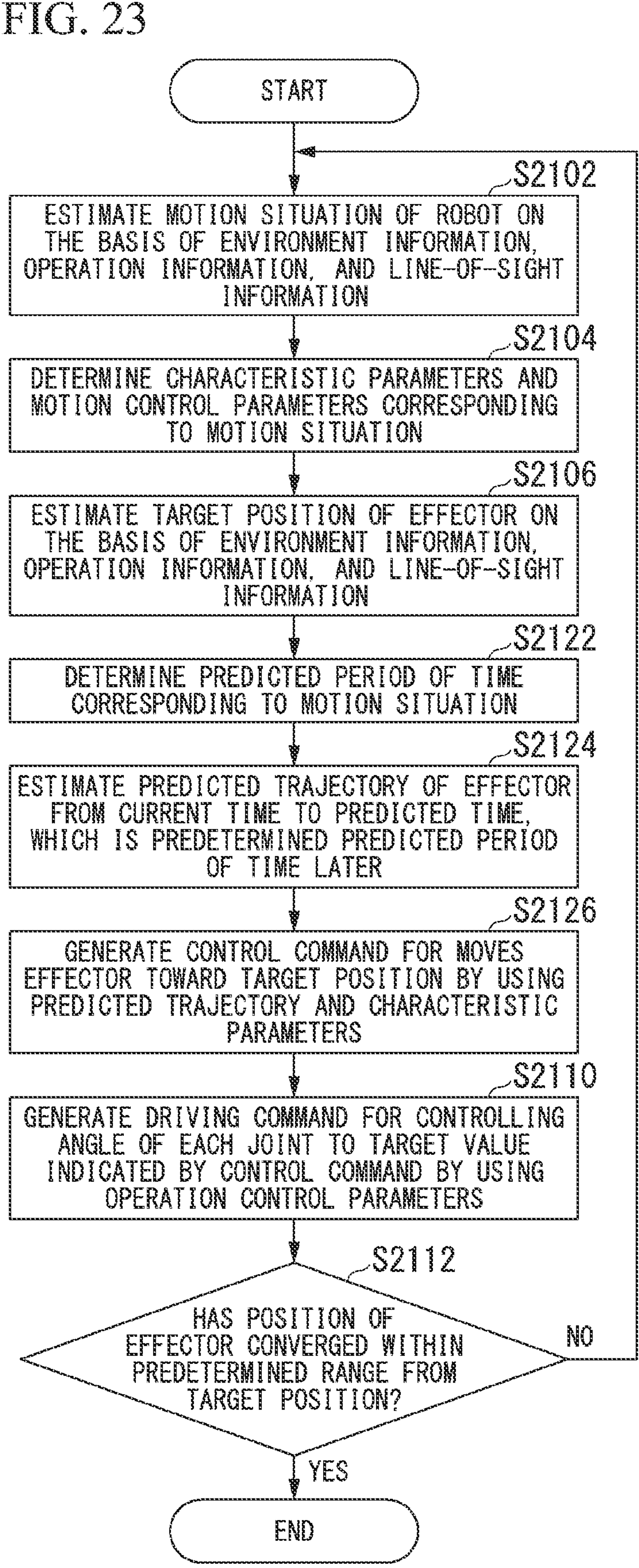
FIG. 23 is a flowchart illustrating an example of motion control processing according to the fourth embodiment.

Next, an example of motion control processing according to the present embodiment will be described. FIG. 23 is a flowchart illustrating an example of motion control processing according to the present embodiment. The processing illustrated in FIG. 23 further includes steps S2122, S2124, and S2126 in addition to the processing illustrated in FIG. 20.

The target position estimation unit 2036 terminates the processing of step S2106 and then proceeds to the processing of step S2122.

(Step S2122) The motion situation estimation unit 2034 determines a predicted period of time corresponding to a motion situation determined by itself with reference to the predicted time table.

(Step S2124) The trajectory prediction unit 2046 estimates a predicted trajectory of the effector from the current time to the predicted time, which is a predetermined predicted period of time later, by using robot motion information and operation information.

(Step S2126) The control command generation unit 2038 generates a control command indicating an angle of each joint that moves the effector toward the target position as a target value by using the predicted trajectory and the characteristic parameters. Thereafter, the processing proceeds to the processing of step S2110.

In step S2122, the motion situation estimation unit 2034 may specify driving control parameters corresponding to the motion situation with reference to the driving control parameter table.

In step S2110, the driving control unit 2040 may calculate a first factor and a second factor on the basis of a target value and a deviation between the target value and an output value by using the specified driving control parameters, and may determine an operation amount by synthesizing the calculated first factor and the calculated second factor. The driving control unit 2040 generates a driving command indicating the determined operation amount and outputs the generated driving command to the driving unit 2024.

As described above, the control device 2030 according to the present embodiment includes the motion situation estimation unit 2034 that estimates the motion situation of the robot 2020 on the basis of at least environment information indicating the motion environment of the robot 2020 and operation information indicating the motion situation. The control device 2030 includes the control command generation unit 2038 that generates a control command for operating the effector of the robot 2020 on the basis of the operation information. The control device 2030 includes the driving control unit 2040 that controls the motion of the robot 2020 on the basis of the control command. The control command generation unit 2038 determines a control command on the basis of characteristic parameters related to control characteristics corresponding to a motion situation.

According to this configuration, the motion of the effector is controlled using the operation information in accordance with the motion situation estimated on the basis of the motion environment and the operation situation. Since the effector is operated in accordance with the motion situation, the working efficiency of the robot 2020 is improved.

The motion situation estimation unit 2034 may further estimate a motion situation on the basis of operator information indicating the situation of the operator who operates the robot.

According to this configuration, the motion situation can be accurately estimated with reference to the operator's situation. For this reason, the work efficiency of the robot 2020 is further improved.

The control device 2030 may further include the target position estimation unit 2036 that estimates a target position of the effector on the basis of operation information and environment information.

According to this configuration, the motion of the robot 2020 is controlled such that the effector moves toward the target position determined on the basis of a motion environment and an operation situation. Since the operator does not have to perform an operation for accurately indicating the target position, the work efficiency of the robot 2020 is further improved.

The control command generation unit 2038 may determine an operation amount for driving the effector toward the target position on the basis of characteristic parameters. The characteristic parameters may include a convergence determination parameter indicating a convergence determination condition for the target position.

According to this configuration, the convergence determination condition for determining that the position of the effector has converged to the target position is determined in accordance with a motion situation. For this reason, it is possible to realize position accuracy or solution stability that is required or expected depending on the motion situation.

The control command generation unit 2038 may determine an operation amount on the basis of an objective function indicating a load for operating the effector toward a target position. The objective function is a function obtained by synthesizing a plurality of types of factors, and characteristic parameters may include a weight of each factor.

According to this configuration, a weight for a factor of a load related to the motion of the effector is determined in accordance with a motion situation. For this reason, motion characteristics can be adjusted to reduce the types of factors required or expected depending on a motion situation.

The driving control unit 2040 may determine an operation amount so that a deviation between a target value based on a control command and an output value from a motion mechanism driving the effector is reduced on the basis of characteristic parameters. The characteristic parameters may include gains for the operation amount of the deviation.

According to this configuration, a gain for an operation amount of a deviation between a target value and an output value is adjusted in accordance with a motion situation. Since a speed at which the effector is moved to a target position can be adjusted in accordance with a motion situation, the efficiency of the operator's work using the robot is improved.

The control device 2030 includes the trajectory prediction unit 2046 that determines a predicted trajectory of the effector of the robot 2020 from the current time to the predicted time after a predetermined period of predicted time on the basis of at least motion information indicating the motion of the robot 2020 and operation information indicating the motion situation, and the control command generation unit 2038 that generates a control command on the basis of the predicted trajectory.

According to this configuration, the effector of the robot 2020 is driven in response to the control command generated on the basis of the predicted trajectory of the effector from the current time to the later predicted time, and thus so a delay (following delay) until an operation is reflected in the motion of the robot 2020 is reduced or eliminated. Since the feeling of operation is improved for the operator, it is possible to achieve both an improvement in work efficiency and a reduction in burden.

The control device 2030 may further include the motion situation estimation unit 2034 that estimates the motion situation of the robot 2020 on the basis of at least environment information indicating the motion environment of the robot 2020 and operation information. The trajectory prediction unit 2046 may determine a predicted period of time on the basis of the motion situation.

According to this configuration, a predicted period of time is determined in accordance with a motion situation of the robot 2020 which is estimated from a motion environment and an operation situation of the robot 2020. For this reason, the balance between an improvement in the feeling of operation and the accuracy of the position of the effector to be controlled is adjusted in accordance with the motion situation.

The control device 2030 may also include the driving control unit 2040 that determines an operation amount for a motion mechanism on the basis of a target value of the displacement of the motion mechanism of the robot 2020 which gives a target position of the effector for each time constituting a predicted trajectory. The motion situation estimation unit 2034 may determine a gain of the target value on the basis of the motion situation.

According to this configuration, the contribution of the target value to the operation amount for the motion mechanism is adjusted in accordance with the motion situation. For this reason, the sensitivity of the motion of the effector for the operator's operation is adjusted in accordance with the motion situation.

The driving control unit 2040 may determine an operation amount by synthesizing a first component and a second component, the first component being based on a first gain and a deviation between an output value of the displacement that gives the current position of the effector and a target value, and the second component being based on a target value and a second gain. The motion situation estimation unit 2034 may determine the first gain and the second gain on the basis of a motion situation.

According to this configuration, the balance between a feedback term and a feedforward term is adjusted in accordance with the motion situation. For this reason, the balance between the sensitivity and accuracy of the motion of the effector for the operator's operation is adjusted in accordance with the motion situation.

In addition, the motion situation estimation unit 2034 may further estimate a motion situation on the basis of operator information indicating the situation of the operator who operates the robot.

According to this configuration, the motion situation can be further accurately estimated with reference to the operator's situation. For this reason, the work efficiency of the robot 2020 is further improved, and a reduction in work burden of the robot is further promoted.

Although the embodiments of the present invention have been described in detail with reference to the drawings, the specific configurations are not limited to those described above, and various design changes can be made without departing from the gist of the present invention.

The above-described embodiments and modification examples thereof may be combined with each other as long as there is no contradiction, and some of them may be omitted.

For example, in the above-described embodiments, the target position estimation unit 2036 may be omitted, and the processing based on a target position estimated by the target position estimation unit 2036 may be omitted.

In the fourth embodiment, when a predicted period of time is fixed, the motion situation estimation unit 2034 may be omitted, and the processing based on a motion situation may be omitted.

In the environment information acquisition unit 2080, the distance measurement unit 2084 may be integrated with the imaging unit 2082 and configured as a three-dimensional image capture unit. The environment information acquisition unit 2080 may include a multi-viewpoint imaging unit instead of the imaging unit 2082 and the distance measurement unit 2084. The multi-viewpoint imaging unit is an imaging unit that has a plurality of viewpoints and can capture an image for each viewpoint. The multi-viewpoint imaging unit includes a so-called stereo camera. The motion environment of the robot 2020 is three-dimensionally represented by images for each viewpoint (multi-viewpoint images) captured by the multi-viewpoint imaging unit. The target position estimation unit 2036 can specify a region occupied by an object from the motion environment of the robot 2020 by analyzing the multi-viewpoint images.

A portion or the entirety of the display device 2050 may be omitted. Although a case where line-of-sight information indicates the line-of-sight direction of one eye (for example, the left eye) of the operator has been mainly described, the present invention is not limited thereto. The line-of-sight information may indicate the line-of-sight directions of the left eye and the right eye. When the line-of-sight direction of one eye cannot be used (for example, blinking) at a certain time, the target position estimation unit 2036 may use the line-of-sight direction of the other eye when determining a gazing point. When the line-of-sight directions of both eyes can be used, the target position estimation unit 2036 may determine an intersection point where the line segments of the line-of-sight directions of both eyes intersect each other, or a midpoint of the nearest point of each of the line segments as a line-of-sight point. Then, the target position estimation unit 2036 may determine the direction from the head to the line-of-sight point as a line-of-sight direction representing the line-of-sight direction of both eyes, and determine an intersection point between the determined line-of-sight direction and the surface of an object. The determined intersection point is used to set a target position.

The robot 2020 may include a plurality of manipulators. The plurality of manipulators may correspond to one-side forearms and hands of a plurality of operators. The individual manipulators are operable in response to motions of one-side forearms and hands of the operators. The control device 2030 may determine one target position for each manipulator by using the above-described method, and operate the manipulator toward the determined target position. The robot 2020 may be a dual-armed robot with two manipulators. For the dual-arm robot, for example, one manipulator and the other manipulator may correspond to the left and right hands of one operator, respectively.

REFERENCE SIGNS LIST

1 Robot remote control system
2 Robot
3 Robot remote control device
5 HMD
6 Controller
7 Environment sensor
21 Control unit
22 Driving unit
23 Sound collection unit
25 Storage unit
26 Power supply
27 Sensor
31 Information acquisition unit
33 Intention estimation unit
34 Gripping method determination unit
35 Robot state image creation unit
36 Transmission unit
37 Storage unit
51 Image display unit
52 Line-of-sight detection unit
53 Sensor
54 Control unit
55 Communication unit
61 Sensor
62 Control unit
63 Communication unit
64 Feedback means
71 Imaging device
72 Sensor
73 Object position detection unit
74 Communication unit
1001 Robot remote operation control system
1002 Robot
1003 Robot remote operation control device
1005 HMD
1006 Controller
1007 Environment sensor
1021 Control unit
1022 Driving unit
1023 Sound collection unit
1025 Storage unit
1026 Power supply
1027 Sensor
1221 Gripping portion
1031 Information acquisition unit
1033 Intention estimation unit
1034 Control command generation unit
1035 Robot state image creation unit
1036 Transmission unit
1037 Storage unit
1051 Image display unit
1052 Line-of-sight detection unit
1054 Control unit
1055 Communication unit
1061 Sensor
1062 Control unit
1063 Communication unit
1064 Feedback means
1071 Imaging device
1072 Sensor
1073 Communication unit
S2001 Robot system
2020 Robot
2024 Driving unit
2026 Driving sensor
2028 Power supply
2030 Control device
2032 Information acquisition unit
2034 Motion situation estimation unit
2036 Target position estimation unit
2038 Control command generation unit
2040 Driving control unit
2042 Communication unit
2044 Storage unit
2046 Trajectory prediction unit

2050 Display device
2052 Display unit
2054 Line-of-sight detection unit
2056 Motion detection unit
2058 Control unit
2060 Communication unit
2070 Operation device
2072 Motion detection unit
2074 Control unit
2076 Communication unit
2080 Environment information acquisition unit
2082 Imaging unit
2084 Distance measurement unit
2086 Communication unit

What is claimed is:

1. A robot remote operation control device comprising:
at least one memory that stores executable instructions; and
at least one processor configured to process the executable instructions that, when executed by the at least one processor, facilitate performance of operations that enable an operator to remotely operate a robot capable of gripping an object, the operations comprising:
acquiring operator state information on a state of the operator who operates the robot;
estimating a motion intention of the operator who causes the robot to perform a motion, on the basis of the operator state information, resulting in an estimated determined motion intention;
determining a gripping method for the object on the basis of the estimated motion intention of the operator, resulting in a determined gripping method,
wherein the estimating of the motion intention comprises:
classifying a gripping posture of the operator into a predetermined classification of gripping postures from a handshape of the operator,
estimating the motion intention of the operator on a basis of a classification result of the gripping posture, and
on the basis of the operator state information and robot state information representing a state of the robot, estimating a future trajectory of the operator's hand tip which the operator intends as the motion intention, and
wherein the determining of the gripping method comprises:
calculating contact points of fingers of the robot to the object on the basis of the classification result of the gripping posture, a shape of the object, physical parameters of the object, and torques that can be output by the robot,
calculating joint angles of the fingers on the basis of the contact points, and
correcting motions of the fingers of the robot operated by the operator on the basis of the motion intention and the joint angles; and
operating the robot in accordance with the determined motion intention and the determined gripping method.

2. The robot remote operation control device according to claim 1, wherein the classifying of the gripping posture comprises classifying the gripping posture on the basis of the operator state information.

3. The robot remote operation control device according to claim 1, wherein the estimating of the motion intention comprises:
estimating at least one of:
a way of gripping an object desired to be gripped, or
the object desired to be gripped on the basis of the operator state information.

4. The robot remote operation control device according to claim 1, wherein the estimating of the motion intention comprises:
estimating which object is desired to be gripped on the basis of the operator state information, and
estimating a way of gripping the object desired to be gripped, related to the estimated object.

5. The robot remote operation control device according to claim 4,
wherein the estimating of the way of gripping the object comprises estimating the way of gripping the object on the basis of the operator state information, and
wherein the estimating of the object desired to be gripped comprises estimating the object desired to be gripped on the basis of an estimated manner of gripping the object desired to be gripped.

6. The robot remote operation control device according to claim 1, wherein the operator state information comprises at least one of:
line-of-sight information of the operator,
movement information of the operator's arm, or
movement information of the operator's head.

7. The robot remote operation control device according to claim 4, wherein the operations further comprise:
acquiring position information of the object, resulting in acquired position information, wherein the estimating of which object is desired to be gripped is based further on the acquired position information.

8. The robot remote operation control device according to claim 1, wherein the determining of the gripping method further comprises:
acquiring position information of the gripping portion provided in the robot, and
correcting the position information of the gripping portion on the basis of the operator state information.

9. The robot remote operation control device according to claim 8, further comprising:
creating a robot state image based on:
the information on the object,
the position information of the gripping portion,
the operator state information, and
the corrected position information of the gripping portion, wherein the estimating of the motion intention is based further on the robot state image.

10. A robot remote operation control system comprising:
a robot comprising:
a gripping portion that grips the object;
the robot remote operation control device according to claim 1;
an environment sensor that detects position information of the object and position information of the gripping portion; and
a sensor that detects operator state information on the state of the operator who operates the robot, resulting in a determined state of the operator, wherein the estimating of the motion intention comprises:
classifying a gripping posture of the operator into a predetermined classification of gripping postures from a handshape of the operator,
estimating the motion intention of the operator on a basis of a classification result of the gripping posture, and on the basis of the operator state information and robot state information representing a state of the robot, estimating a future trajectory of the operator's hand tip which the operator intends as the motion intention, and wherein the determining of the gripping method comprises:

calculating contact points of fingers of the robot to the object on the basis of the classification result of the gripping posture, a shape of the object, physical parameters of the object, and torques that can be output by the robot, calculating joint angles of the fingers on the basis of the contact points, and correcting motions of the fingers of the robot operated by the operator on the basis of the motion intention and the joint angles; and operating the robot in accordance with the determined state of the operator.

11. A robot remote operation control method comprising:

acquiring, by a computing system comprising at least one processor, operator state information on a state of an operator who operates a robot;

estimating, by the computing system, a motion intention of the operator, on a basis of the operator state information, resulting in an estimated motion intention;

determining, by the computing system, a gripping method for the object on a basis of the estimated motion intention, resulting in a determined gripping method, wherein the estimating of the motion intention comprises:

classifying a gripping posture of the operator into a predetermined classification of gripping postures from a handshape of the operator, estimating the motion intention of the operator on a basis of a classification result of the gripping posture, and on the basis of the operator state information and robot state information representing a state of the robot, estimating, by the computing system, a future trajectory of the operator's hand tip which the operator intends as the motion intention, and wherein the determining of the gripping method comprises:

calculating contact points of fingers of the robot to the object on the basis of the classification result of the gripping posture, a shape of the object, physical parameters of the object, and torques that can be output by the robot, calculating joint angles of the fingers on the basis of the contact points, and correcting motions of the fingers of the robot operated by the operator on the basis of the motion intention and the joint angles; and operating, by the computing system, the robot in accordance with the determined motion intention and the determined gripping method.

12. A non-transitory machine-readable medium comprising executable instructions that, when executed by at least one processor of computer equipment, facilitate performance of operations to remotely operate a robot capable of gripping an object, the operations comprising:

acquiring operator state information on a state of an operator who operates the robot;

estimating a motion intention of the operator on the basis of the operator state information, resulting in an estimated motion intention;

determining a gripping method for the object on the basis of the estimated motion intention of the operator, resulting in a determined gripping method, wherein the estimating of the motion intention comprises:

classifying a gripping posture of the operator into a predetermined classification of gripping postures from a handshape of the operator, estimating the motion intention of the operator on the basis of a classification result of the gripping posture, and on the basis of the operator state information and a robot state information representing a state of the robot, estimating a future trajectory of the operator's hand tip which the operator intends as the motion intention, and wherein the determining of the gripping method comprises:

calculating contact points of fingers of the robot to the object on the basis of the classification result of the gripping posture, a shape of the object, physical parameters of the object, and torques that can be output by the robot, calculating joint angles of the fingers on the basis of the contact points, and correcting motions of the fingers of the robot operated by the operator on the basis of the motion intention and the joint angles; and operating the robot in accordance with the determined motion intention and the determined gripping method.

* * * * *